US012286341B2

(12) United States Patent
Guzik et al.

(10) Patent No.: US 12,286,341 B2
(45) Date of Patent: Apr. 29, 2025

(54) FUEL STORAGE AND SUPPLY ARRANGEMENT HAVING FUEL CONDITIONING ASSEMBLY

(71) Applicant: Veeder-Root Company, Simsbury, CT (US)

(72) Inventors: Richard Guzik, Manchester, CT (US); Diane Sinosky, Enfield, CT (US); James Bevins, South Windsor, CT (US)

(73) Assignee: Veeder-Root Company, Simsbury, CT (US)

( * ) Notice: Subject to any disclaimer, the term of this patent is extended or adjusted under 35 U.S.C. 154(b) by 0 days.

(21) Appl. No.: 18/221,739

(22) Filed: Jul. 13, 2023

(65) Prior Publication Data

US 2023/0356996 A1 Nov. 9, 2023

Related U.S. Application Data

(62) Division of application No. 17/894,513, filed on Aug. 24, 2022, which is a division of application No.
(Continued)

(51) Int. Cl.
*B67D 7/36* (2010.01)
*B67D 7/22* (2010.01)
*B67D 7/76* (2010.01)

(52) U.S. Cl.
CPC ............. *B67D 7/766* (2013.01); *B67D 7/221* (2013.01); *B67D 7/36* (2013.01)

(58) Field of Classification Search
CPC .................................. B67D 7/36; B67D 7/766
See application file for complete search history.

(56) References Cited

U.S. PATENT DOCUMENTS 1,156,946 A 10/1915 Vandercook
1,218,623 A 3/1917 Brillhart
(Continued)

FOREIGN PATENT DOCUMENTS

BR PI1006089 A2 11/2016
CA 2529839 C 3/2012
(Continued)

OTHER PUBLICATIONS

"Compact SmartFilter Plumbing" schematic, dated May 30, 2012, copyright 2012, Simplex, Inc., all enclosed pages cited.
(Continued)

*Primary Examiner* — Paul J Gray
(74) *Attorney, Agent, or Firm* — Nelson Mullins Riley & Scarborough LLP

(57) ABSTRACT

A method of deploying a water intake device in a fuel storage tank involves providing a water intake device having an elongate flow structure including at least one flexible flow tube and an elongate substrate adjacent to the flow tube, wherein the substrate provides a semi-rigid characteristic that allows the elongate flow structure to be guided. Another step of the method involves providing a guide tube having a straight portion and an arcuate portion at a distal end of the guide tube. Another step of the method involves installing the guide tube generally vertically into a fuel storage tank with the arcuate portion directed toward a desired guidance direction. Another step of the method involves moving the elongate flow structure of the water intake device through the guide tube into a deployed position.

5 Claims, 18 Drawing Sheets

Related U.S. Application Data

17/488,451, filed on Sep. 29, 2021, now Pat. No. 11,634,316.

(60) Provisional application No. 63/085,697, filed on Sep. 30, 2020.

(56) References Cited

U.S. PATENT DOCUMENTS

| | | | | |
|---|---|---|---|---|
| 2,241,337 | A | 5/1941 | Work | |
| 2,442,379 | A | 6/1948 | Samiran | |
| 3,397,789 | A | 8/1968 | Valdespino | |
| 3,872,886 | A | 3/1975 | Shotmeyer | |
| 4,315,819 | A | 2/1982 | King et al. | |
| 4,500,425 | A | 2/1985 | Thornton et al. | |
| 4,502,954 | A | 3/1985 | Druffel | |
| 4,728,428 | A | 3/1988 | Broussard, Sr. | |
| 4,784,751 | A | 11/1988 | McGehee | |
| 4,799,504 | A | 1/1989 | Scragg et al. | |
| 4,820,053 | A | 4/1989 | Rivers | |
| 5,053,120 | A | 10/1991 | Mollmann | |
| 5,065,781 | A * | 11/1991 | Cox | B08B 9/0933 137/15.04 |
| 5,122,264 | A | 6/1992 | Mohr et al. | |
| 5,192,430 | A | 3/1993 | Mohr | |
| 5,236,000 | A * | 8/1993 | Kizer | B60K 15/077 137/590 |
| 5,336,418 | A | 8/1994 | Rawlins | |
| 5,368,001 | A | 11/1994 | Roche | |
| 5,409,025 | A | 4/1995 | Semler et al. | |
| 5,534,161 | A | 7/1996 | Tarr et al. | |
| 5,544,518 | A | 8/1996 | Hart et al. | |
| 6,042,722 | A | 3/2000 | Lenz | |
| 6,058,968 | A | 5/2000 | Carter | |
| 6,110,383 | A | 8/2000 | Coombs et al. | |
| 6,189,613 | B1 | 2/2001 | Chachula et al. | |
| 6,371,087 | B1 | 4/2002 | Condran et al. | |
| 6,596,174 | B1 | 7/2003 | Marcus | |
| 6,923,190 | B1 | 8/2005 | Kavadeles et al. | |
| 7,150,269 | B2 | 12/2006 | de Monts de Savasse et al. | |
| 7,655,140 | B2 | 2/2010 | Wieczorek et al. | |
| 7,726,336 | B2 | 6/2010 | Dolson | |
| 7,883,627 | B1 | 2/2011 | Barrett | |
| 8,277,547 | B2 | 10/2012 | Folkvang | |
| 8,366,312 | B1 | 2/2013 | Valdez et al. | |
| 8,486,261 | B2 | 7/2013 | Buchholz et al. | |
| 8,636,482 | B2 | 1/2014 | Dolson | |
| 9,396,854 | B2 | 7/2016 | Geers et al. | |
| 9,863,581 | B2 | 1/2018 | Santos et al. | |
| 10,865,098 | B2 | 12/2020 | Gibson et al. | |
| 11,111,130 | B2 | 9/2021 | Bevins et al. | |
| 11,634,316 | B2 | 4/2023 | Guzik et al. | |
| 2004/0050804 | A1 | 3/2004 | Dittmann et al. | |
| 2005/0121374 | A1 | 6/2005 | Girondi | |
| 2006/0207924 | A1 | 9/2006 | De La Azuela et al. | |
| 2006/0231501 | A1 | 10/2006 | Sundeng | |
| 2008/0217188 | A1 | 9/2008 | Borchert et al. | |
| 2008/0230146 | A1 | 9/2008 | Kastner et al. | |
| 2010/0096039 | A1 | 4/2010 | Midttun | |
| 2011/0147290 | A1 | 6/2011 | Braunheim | |
| 2012/0042855 | A1 | 2/2012 | Vogely et al. | |
| 2012/0042961 | A1 | 2/2012 | Anderson et al. | |
| 2012/0192480 | A1 | 8/2012 | Barrett | |
| 2012/0261437 | A1 | 10/2012 | Sabo et al. | |
| 2014/0224215 | A1 | 8/2014 | Lehman et al. | |
| 2016/0039656 | A1 | 2/2016 | Walsh et al. | |
| 2016/0059161 | A1 | 3/2016 | Heine et al. | |
| 2017/0173505 | A1 | 6/2017 | Dhingra et al. | |
| 2017/0282131 | A1 | 10/2017 | Berzinis et al. | |
| 2018/0257925 | A1 | 9/2018 | Schultz et al. | |
| 2019/0358565 | A1 | 11/2019 | Braunheim et al. | |
| 2020/0017351 | A1 | 1/2020 | Schultz et al. | |
| 2020/0102207 | A1 | 4/2020 | Gibson et al. | |
| 2022/0098026 | A1 | 3/2022 | Guzik et al. | |
| 2022/0402749 | A1 | 12/2022 | Guzik et al. | |

FOREIGN PATENT DOCUMENTS

| | | | |
|---|---|---|---|
| DE | 19736029 | C2 | 1/2002 |
| EP | 2313639 | B1 | 3/2018 |
| FR | 2945080 | B1 | 5/2016 |
| GB | 2129329 | B | 5/1986 |
| JP | 5726176 | B2 | 5/2015 |
| WO | 2012172286 | A1 | 12/2012 |
| WO | 2016066236 | A1 | 5/2016 |
| WO | 2017194588 | A1 | 11/2017 |
| WO | 2020/180348 | A1 | 9/2020 |

OTHER PUBLICATIONS

"Simplex SmartFilter Manual, Oct. 2010," owner's manual, copyright 2010, Simplex Inc., all enclosed pages cited.

"The Red Jacket AG Armor™ Submersible Turbine Pumps Installation, Service, & Parts Lists" © Veeder-Root 2019. All rights reserved, accessed Jan. 25, 2022.

International Search Report and Written Opinion for the corresponding International application No. PCT/US2021/052801 dated Feb. 7, 2022; 17 pages.

Simplex "SmartFilter Series: Intelligent Filtration and Maintenance Systems for Fuel Oil" Spec Sheet, copyright 2018, Simplex, Inc., all enclosed pages cited.

Extended European Search Report corresponding European Patent Application No. 21876454.6, dated Sep. 3, 2024, 7 pages.

* cited by examiner

FUEL STORAGE AND SUPPLY ARRANGEMENT HAVING FUEL CONDITIONING ASSEMBLY

CROSS-REFERENCE TO RELATED APPLICATIONS

This application is a divisional of copending U.S. application Ser. No. 17/894,513, filed Aug. 24, 2022, which is a divisional of U.S. application Ser. No. 17/488,451, filed Sep. 29, 2021, now U.S. Pat. No. 11,634,316, which is based upon and claims the benefit of U.S. provisional patent application Ser. No. 63/085,697, filed Sep. 30, 2020. All of the aforementioned applications are incorporated herein fully by reference for all purposes.

FIELD OF THE INVENTION

The present invention relates generally to fuel dispensing environments having one or more fuel storage tanks. More particularly, the present invention relates to a fuel dispensing environment in which one or more of the storage tanks are equipped with a fuel conditioning assembly.

BACKGROUND

Fuel dispensing environments, such as retail fueling stations and fuel depots, typically store fuel in fuel tanks, such as an underground storage tank (UST). In some instances, small amounts of water or debris may be introduced into the storage tank, which can degrade the fuel. For example, during periods of rain, water typically flows over pavement in the forecourt region of a service station into a storm drain. Occasionally, some of this water may make its way into an underground storage tank. Generally, water and debris are denser than the fuel stored in the tank and thus settle near the bottom of the tank. Water and fuel are immiscible, which causes a water layer to form below the fuel creating a fuel/water interface layer in the storage tank. The level of the fuel/water interface is typically monitored to ensure that water is not introduced into the inlet through which fuel is drawn from the tank.

When storing ultra-low sulfur diesel (ULSD) fuel and/or ULSD blended with biodiesel fuel products, hydrocarbon utilizing microbes, e.g., "humbugs," may develop. These microbes can cause microbial induced corrosion (MIC) in fuel delivery systems and ancillary components, including fuel dispenser components, metering devices, shear valves, and fuel nozzles. In addition, microbial induced contamination can result.

Costly active measures can be taken to clean a contaminated tank, remove water and polish the fuel. This requires shutting the tank down, which adds an additional cost of lost sales to the already high cost of cleaning. Such active measures typically involve passing the contents of the tank through progressively restrictive filter media multiple times and, ultimately, through a coalescing filter that removes any free water. These cleaning systems are large scale, typically truck mounted and are designed to clean up contamination as opposed to preventing contamination.

Passive means have been utilized to prevent or detect entrance of water into fuel tanks, such as vent line caps, inlet seals, tank inspections, and regular quality testing. However, even small amounts of water may cause degradation of the fuel tank and/or fuel. When water is detected, the entirety of the storage tank may need to be pumped into settling tanks to have the water drained. After the water is drained, the fuel may then be reintroduced to the storage tank. Alternatively, the fuel tank may be allowed to settle, and a suction hose is used to draw out water at the bottom of the fuel tank until the water layer is removed and only fuel flows through the suction hose.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

According to one aspect, the present invention provides a fuel storage and supply arrangement serving as a source of fuel to be dispensed via at least one fuel dispenser in a fuel dispensing environment. The arrangement comprises a storage tank for containing a quantity of the fuel. A pump assembly for drawing the fuel from the storage tank and providing the fuel under pressure is also provided. A fuel supply line is configured to convey the fuel under pressure from the pump assembly.

The fuel storage and supply arrangement further comprises a fuel conditioning assembly including a housing having a storage volume, a housing inlet receiving the fuel under pressure created by the pump assembly, a housing outlet through which fuel exits the housing, and a housing port through which fuel can be drawn into the housing. A vacuum source in fluid communication with the housing outlet is operative to selectively apply a vacuum to the outlet of the housing so that liquid can be drawn into the housing via the port. A water intake device in fluid communication with the housing port has at least one inlet situated adjacent to a bottom of the fuel storage tank.

According to an exemplary embodiment, an inlet valve situated to allow flow into the housing inlet and an outlet valve situated to allow flow from the housing outlet are also provided. The vacuum source may comprise a siphon element through which pressurized fuel flows to create a vacuum at a vacuum port thereof, the vacuum port being in selective fluid communication with the housing outlet via the outlet valve. The siphon element may comprise a siphon cartridge attached to a packer manifold of the pump assembly. In such embodiments, the pressurized fuel that flows through the siphon element may be a diverted quantity of the fuel under pressure provided by the pump assembly. Fuel may be selectively returned to the storage tank through the housing port via the water intake device.

According to an exemplary embodiment, the housing may further have filter media for removal of particulates. In addition, the housing may have a water separation portion that removes water in fuel supplied to the housing via the housing inlet. The filter may be located above the water separation portion.

According to an exemplary embodiment, the port may be located above a maximum allowable level of water in the housing. For example, the fuel conditioning assembly further may have a level indicator that is operative to indicate a level of water in the housing.

According to an exemplary embodiment, the water intake device may have a plurality of parallel tubes that terminate at spaced apart locations along a length of the water intake device. In such embodiments, each of the parallel tubes may provide inflow and outflow depending on a manner of operation of the fuel conditioning assembly. At least a portion of the water intake device may be located inside of a guide tube extending into the fuel storage tank.

Another aspect of the present invention provides a water intake device for use in a fuel storage tank. The water intake device comprises an elongate flow structure including a plurality of flexible flow tubes having respective first ends of different lengths and a second end at a common location. A header manifold is in fluid communication with the second ends of the flow tubes, the header manifold having a single connection port. In addition, the header manifold is configured to allow flow between the flow tubes and the connection port.

According to an exemplary embodiment, the elongate flow structure preferably assumes a generally L-shaped configuration when deployed in the fuel storage tank. Moreover, a sled structure may be located at a distal end of the elongate flow structure. In addition, a sheath containing the plurality of flexible flow tubes may be provided. For example, the sheath may define openings at the respective first ends of the flow tubes. In addition, an elongate substrate, such as a generally flat band (e.g., formed of stainless steel), may be located in the sheath.

A still further aspect of the present invention provides a water intake device for use in a fuel storage tank. The water intake device comprises an elongate flow structure including at least one flexible flow tube having a distal first end and a proximal second end. A header manifold is in fluid communication with the second end of the flow tube, the header manifold having at least one connection port. The header manifold according to this aspect is configured to allow flow between the flow tube and the connection port. An elongate substrate is adjacent to the flow tube, wherein the elongate flow structure assumes a generally L-shaped configuration when deployed in the fuel storage tank.

A still further aspect of the present invention provides a method of controlling a fuel conditioning assembly that is operative to remove water from a fuel storage tank. One step of the method involves providing a housing having a water separation storage volume, a housing inlet receiving fuel under pressure, a housing outlet through which fuel exits the housing, and a housing port located above a maximum allowable level of water in the housing through which fuel can be drawn into the housing. An inlet valve is situated to allow flow into the housing inlet and an outlet valve is situated to allow flow from the housing outlet. A vacuum source in fluid communication with the housing outlet via the outlet valve is operative to selectively apply a vacuum to the outlet of the housing so that liquid can be drawn into the housing via the port. A water intake device in fluid communication with the housing port has at least one inlet situated adjacent to a bottom of the fuel storage tank.

A further step of the method involves opening the outlet valve while closing the inlet valve to draw liquid from the fuel storage tank into housing via the water intake device and the port and return fuel to the fuel storage tank through the outlet valve. A further step of the method involves opening the inlet valve while closing the outlet valve to receive liquid into the housing from the fuel storage tank via the inlet valve and return fuel to the fuel storage tank through the port and the water intake device.

Another aspect of the present invention provides a method of deploying a water intake device in a fuel storage tank. One step of the method involves providing a water intake device having an elongate flow structure including at least one flexible flow tube and an elongate substrate adjacent to the flow tube, wherein the substrate provides a semi-rigid characteristic that allows the elongate flow structure to be guided. Another step of the method involves providing a guide tube having a straight portion and an arcuate portion at a distal end of the guide tube. Another step of the method involves installing the guide tube generally vertically into a fuel storage tank with the arcuate portion directed toward a desired guidance direction. Another step of the method involves moving the elongate flow structure of the water intake device through the guide tube into a deployed position.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
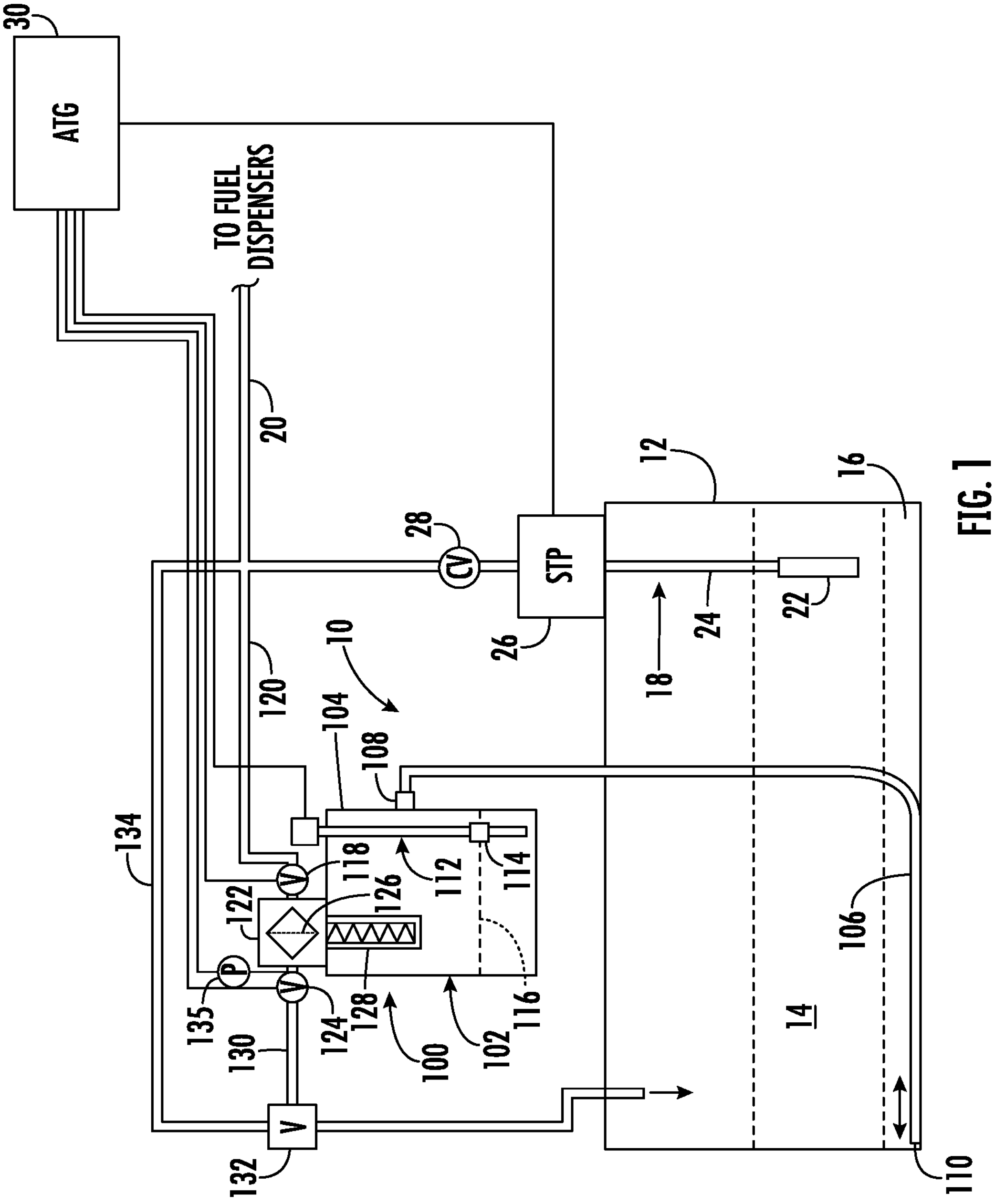
FIG. 1 is a diagrammatic representation of a fuel storage and supply arrangement having a fuel conditioning assembly in accordance with an embodiment of the present invention.

FIG. 1 shows a fuel storage and supply system 10 with a fuel storage tank 12, such as an underground storage tank (UST), which stores a quantity of fuel 14 to be dispensed by fuel dispensers in a fuel dispensing environment, such as a retail fueling station. A quantity of water 16 (or a mixture of fuel and water), is in this case located at the bottom of tank 12. Although not shown, a tank probe typically extends into the storage tank 12. The tank probe has a fuel level sensor for determining the level of fuel 14 in the storage tank 12 and a water level sensor for determining the level of water 16 in the storage tank 12. A fuel pump, such as pump assembly 18 in the depicted embodiment, is associated with the storage tank 12 to pump the fuel 14 into one or more fuel supply lines 20 that provide fuel to the fuel dispenser(s). The path that the fuel 14 flows from the fuel pump to the fuel dispensers is the dispenser flow path.

In embodiment illustrated, the pump assembly 18 includes a pump 22, such as a submersible turbine pump (STP), immersed in the fuel 14 at the lower end of a column 24. A packer manifold 26 defining a main fluid passageway is located at the upper end of the column 24. Pump 22 sends the fuel 14 from the tank 12 through the column 24 to the packer manifold 26, and on to fuel supply line 20. A check valve 28 is located at the outlet of pump assembly 18 to retain fuel 14 under pressure in the fuel supply line(s) 20 when pump 22 is off (e.g., when dispensing is not occurring). As one skilled in the art will appreciate, the packer manifold 26 will typically be located in a containment sump defined below ground level when the storage tank 12 is a UST. Moreover, one skilled in the art will understand and appreciate that, although illustrated as a submersible turbine pump, pump 22 may be any suitable mechanism that draws fuel 14 from the storage tank 12. One example of pump 22 is a Red Jacket submersible turbine pump sold by Veeder-Root Company of Simsbury, Connecticut.

An automatic tank gauge (ATG) 30 manages the storage and supply of fuel 14. (Suitable ATGs include the TLS-450 ATG and the TLS-350 ATG sold by Veeder-Root Company.) In this regard, the ATG 30 is electrically connected to the tank probe to determine the level of fuel 14 and water 16 in the tank 12. ATG 30 is also electrically connected to the fuel dispenser meters in the fuel dispenser(s), or otherwise to control circuitry for the fuel dispenser(s), and to the pump 22. ATG 30 is also preferably in electrical communication with pressure sensor(s) disposed along the fuel supply line(s) 20.

Using information received from the fuel dispenser meters and the pressure sensor(s), ATG 30 can operate the pump 22 to satisfy the needs of the fuel dispenser(s). Moreover, utilizing readings from the line pressure sensor(s), ATG 30 can detect potential leaks in the fuel supply line(s) 20. For example, ATG 30 can use pump 22 to pressurize the fuel supply line(s) 20 during a dormant period when the fuel dispensers are not dispensing fuel 14. Once the fuel supply line 20 is pressurized, ATG 30 turns off the pump 22 and monitors the pressure in the supply lines with the line pressure sensor. Because of the check valve 28, the fuel supply line(s) 20 should maintain pressure for a predetermined period. If ATG 30 determines that the pressure in the fuel supply lines 20 has decreased too much or too quickly, this may indicate a leak somewhere in the fuel storage and supply system 10. The line pressure sensors used to measure pressure in the fuel supply line 20 may be disposed at any appropriate point between the pump assembly 18 and a fuel dispenser.

A fuel conditioning assembly, such as in-sump fuel conditioning (ISFC) assembly 100, is provided to improve the quality of the fuel 14 in the storage tank 10. Specifically, ISFC assembly 100 operates to receive fuel 14, and water 16 when present, from the storage tank 12. A water removal device 102 functions to remove and collect water from the fuel. Water removal device 102 may also include filtration elements to remove particulates or other contaminants in the fuel. After the water is removed and/or the fuel is filtered, the fuel is returned to tank 12. Water removal device 102 may be advantageously located in the containment sump noted above, although this is not necessary for operation.

According to this embodiment, water is separated from the fuel by gravity in a coalescing housing 104. In this regard, the coalescing housing 104 has a volume into which fuel and/or water at the bottom of tank 12 is drawn. As can be seen, ISFC assembly 100 includes a water intake device (WID) 106 in fluid communication with a port 108 defined in coalescing housing 104. For example, port 108 may be located on the side of coalescing housing 104 at a location above the highest permitted water level.

In this embodiment, WID 106 includes a portion located along the bottom of tank 12. Preferably, the inlet 110 of WID 106 may be located substantially at the distal end of WID 106 (i.e., the end farther away from port 108 in the flow path). As a result, inlet 110 may be positioned near the lowest point in tank 12, taking into account the tank's geometry and any tilt in the orientation of tank 12. This will facilitate the retrieval of more water from tank 12 than might otherwise be the case. In this embodiment, WID 106 is also used in certain modes of operation to return fuel to tank 12.

Water removal device 102 includes a level indicator 112 that provides an indication of the level (or amount) of water in coalescing housing 104. In this embodiment, level indicator 112 is in the form of a probe having a float 114 that follows the fuel-water interface 116 in the housing. The level of water is used to determine when it is necessary to empty the coalescing housing 104. In addition, as will be explained more fully below, changes in the water level can be used to dictate certain aspects of the operation of ISFC assembly 100.

An inlet valve 118, such as an electrically operated ball valve, is opened to permit flow of fuel into water separation device 102 under pressure. As can be seen, inlet valve 118 is situated along a branch line 120 that is in fluid communication with the outlet of pump assembly 18 downstream of check valve 28. When inlet valve 118 is opened, fuel will flow into the inlet of water removal device 102 which is, in this case, the inlet of a filtration unit 122. An outlet valve 124, such as an electrically operated ball valve, is similarly located at the outlet of filtration unit 122 (which is thus the outlet of water removal device 102).

In this embodiment, filtration unit 122 includes filter media 126 through which fuel is passed to remove filterable particulates and the like. After passing from the inlet through the filter media, the fuel in this case flows into a water separation portion 128 of filtration unit 122. Water separation portion 128 removes and collects any water that is emulsified in the otherwise clean fuel. Eventually, this collected water falls to the bottom of coalescing housing 102.

A vacuum source, such as a vacuum pump or siphon, is located along outlet line 130 downstream of outlet valve 124 to draw fluid out of water removal device 102. In this embodiment, the vacuum source comprises a siphon device 132 that applies a vacuum to the outlet of water removal device 102 when outlet valve 124 is opened. The vacuum is generated by the venturi effect as fuel is passed through a constriction in siphon device 132. In this embodiment, the fuel to generate the vacuum is supplied by pump assembly 18 along branch line 134, through siphon device 132, and returned to tank 12. Preferably, the return will be at a location nearer the top of the tank than the bottom, as shown, in order to minimize disturbance of the water at the bottom. Outlet line 130 is connected to siphon device 132 at a port in fluid communication with the constriction. Although siphon device 132 is shown as a separate device in FIG. 1, it may preferably be configured as a siphon cartridge inserted into one of the ports of packer manifold 26, as disclosed in U.S. Pat. No. 7,726,336, incorporated herein by reference in its entirety for all purposes.

One or more pressure sensors may be situated at the inlet and/or outlet of water removal device 102 to determine the condition of filter media 126. For example, the illustrated embodiment utilizes a pressure sensor 135 located at the outlet of water removal device 102. Pressure readings taken during use may be compared against a baseline pressure reading taken when filter media 126 is new. If the pressure has dropped below a predetermined threshold from the baseline value (e.g., 20 psi), this indicates that filter media 126 needs to be serviced or replaced. As can be seen, level indicator 112, inlet valve 118, outlet valve 124, and pressure sensor 135 are all in electrical communication with ATG 30 which is, in this case, suitably programmed to control ISFC assembly 100. In other embodiments, a separate controller may be provided which is in electrical communication with ATG 30.

Figure 2:
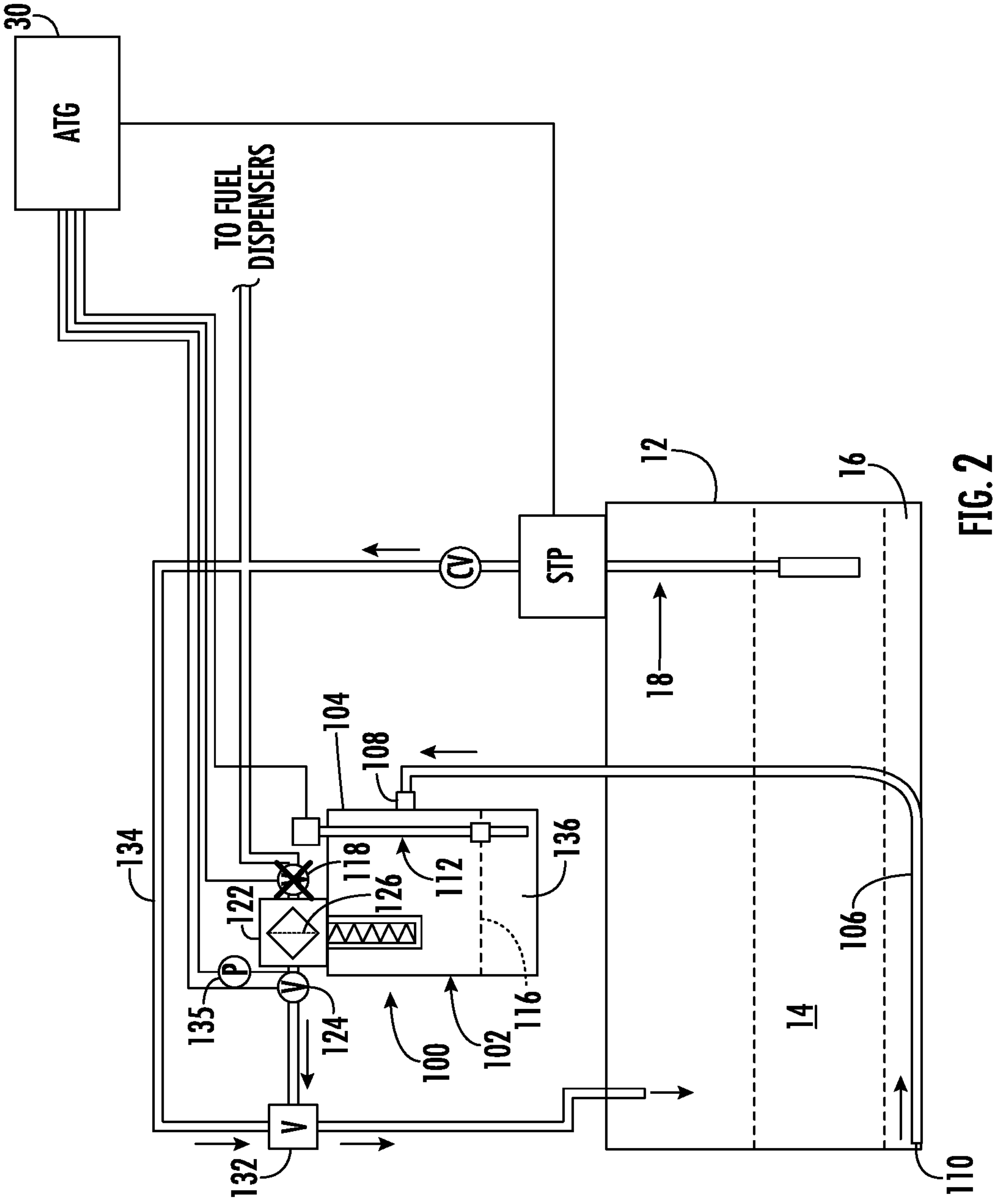
FIG. 2 is a view similar to FIG. 1 showing the fuel conditioning assembly in one manner of operation.

Referring now to FIG. 2, ISFC assembly 100 may be operated with inlet valve 118 closed and outlet valve 124 open. In this case, pump assembly 18 causes pressurized fuel to flow through siphon device 132. However, no fuel flows into the inlet of water removal device 102 because inlet valve 118 is closed. As a result, water removal device 102 will be evacuated. Water and/or fuel at the bottom of tank 12 are thus drawn through WID 106 and into coalescing housing 104 via port 108. Water entering coalescing housing 104 falls by gravity to the bottom and collects, as indicated at 136. Fuel above fuel-water interface 116 is drawn into outlet line 130 and circulated back to tank 12 via siphon device 132.

Readings from level indicator 112 are interpreted by ATG 30 to determine whether water is being removed from the fuel. For example, level indicator 112 can be monitored by software running in ATG 30 during periods in which water and/or fuel are being suctioned from the bottom of tank 12. If water is being collected during the suction periods (as indicated by fuel-water interface 116 rising), the ISFC assembly 100 will continue to operate to obtain additional water. If water is no longer being collected by suction, IFSC assembly 100 may begin intermittent periods of reverse flow, to either push water along the tank bottom toward the inlet 110 of WID 106 or to clear any potential blockages in the tubing. Once all water has been removed, ISFC assembly 100 may shut down and wait for the next delivery of fuel into tank 12. By monitoring the level of fuel-water interface 116, direct control of the inlet and outlet valves 118, 124 can prevent the ejection of any water from the outlet port of water removal device 102. This prevents the undesired condition of returning emulsified water and fuel product to the tank.

As can be seen, there is no intentional mixing of fuel and water in this embodiment. Specifically, water is prevented from entering and entraining in the siphon by the position of port 108 and the operation of level indicator 112. The filtration unit 122 is thus protected from large amounts of water, and is used only for fine water removal and fuel polishing. The frequency with which filtration unit 122 is required to be serviced is reduced accordingly. The incidence of emulsified water, which is difficult to remove, is also reduced.

Figure 3:
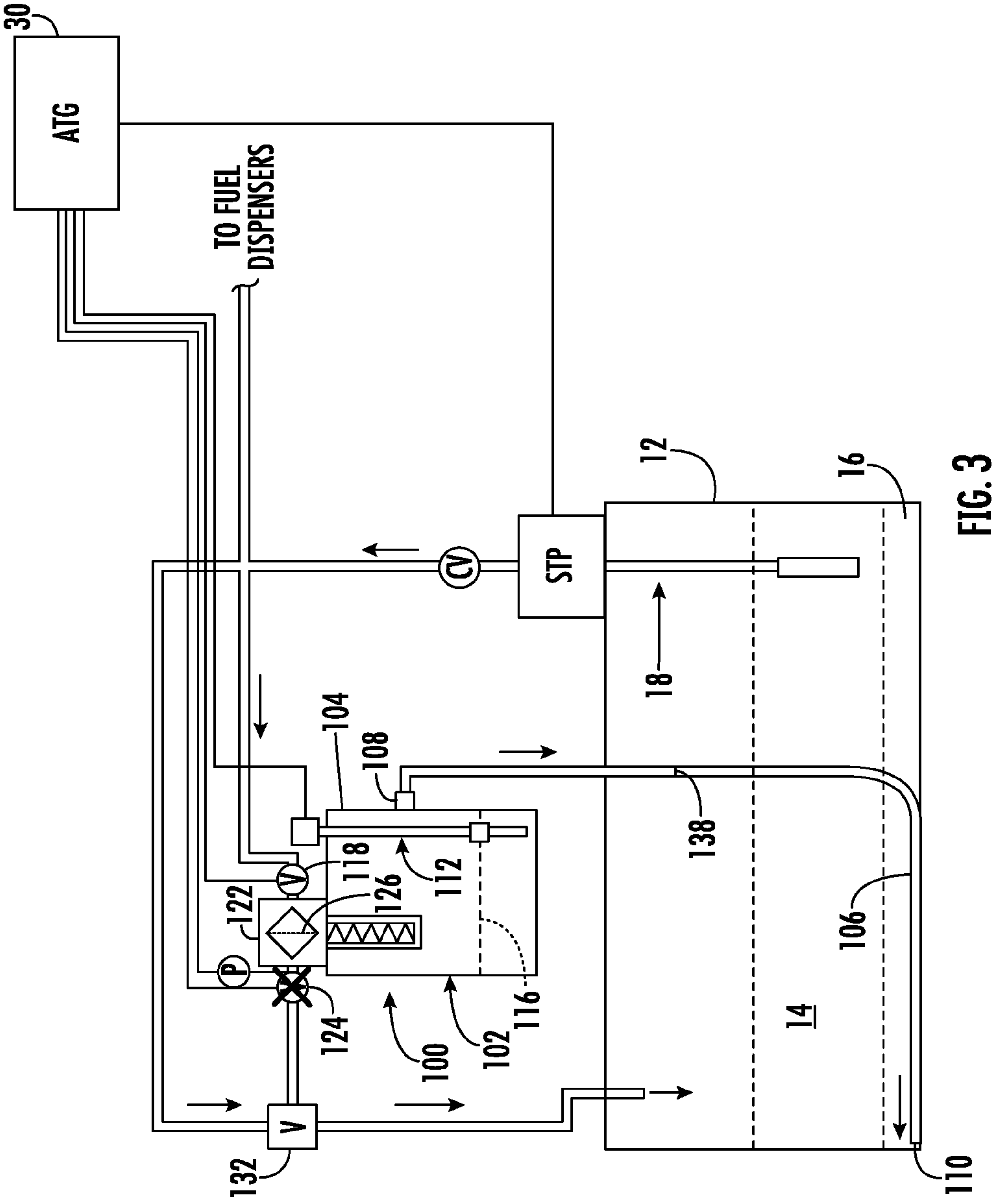
FIG. 3 is a view similar to FIG. 1 showing the fuel conditioning assembly in another manner of operation.

Referring now to FIG. 3, ISFC assembly 100 may be operated with inlet valve 118 open and outlet valve 124 closed. In this case, coalescing housing 102 is pressurized by the pump assembly 18. Fuel thus flows into the coalescing housing 102 through filtration unit 122. As a result, particulates in the fuel are removed by media 126 and small amounts of water that may be present are removed by water separation portion 128. The removed water drops to the bottom of coalescing housing 104 as explained above, while fuel returns to tank 12 through port 108 and WID 106. For example, inlet valve 118 may be opened when it is desired to fill the coalescing housing 102 with fuel that is picked up by pump assembly 18 above the level of water 16 in tank 12. The fuel returning to tank 12 by WID 106 can be used to sweep (push) water along the bottom of tank 12 toward inlet 110 (or to unclog one or more tubes of WID 106).

WID 106 is thus used in this embodiment to alternately couple the bottom of tank 12 to the coalescing housing 102 in a pressurized state (when inlet valve 118 is open) or an evacuated state (when inlet valve 118 is closed and outlet valve 124 is open). In this regard, WID 106 may have one or more tubes, such as several parallel tubes. In the case of several parallel tubes, one or more may operate solely in a suction mode, while others operate as sweeping lines. Alternatively, WID 106 may be configured so that all lines (tubes) are operated in suction or sweep mode simultaneously. Where separate sweeping lines are provided, a check mechanism 138 may be provided to prevent suction into the sweeping tubes. In this case, the single longest tube extends to the inlet 110 of WID 106 to be at the lowest point within tank 12 coincident to any tilt. In this way, water is accessed by collecting at the low point due to gravity or with the additional motivation from the sweeping tubes that allow fuel to flow along the tank bottom so that collected water will tend to flow toward the lowest point. WID 106 is designed so that the water is moved gently, thus decreasing the risk of water emulsification with the fuel. As will be explained below, the sweeping tubes may preferably terminate at various locations along WID 106 spaced apart from the distal end where inlet 110 is located. (In embodiments where there is no check mechanism, all lines will suction or sweep depending on the direction of flow.)

Figure 4:
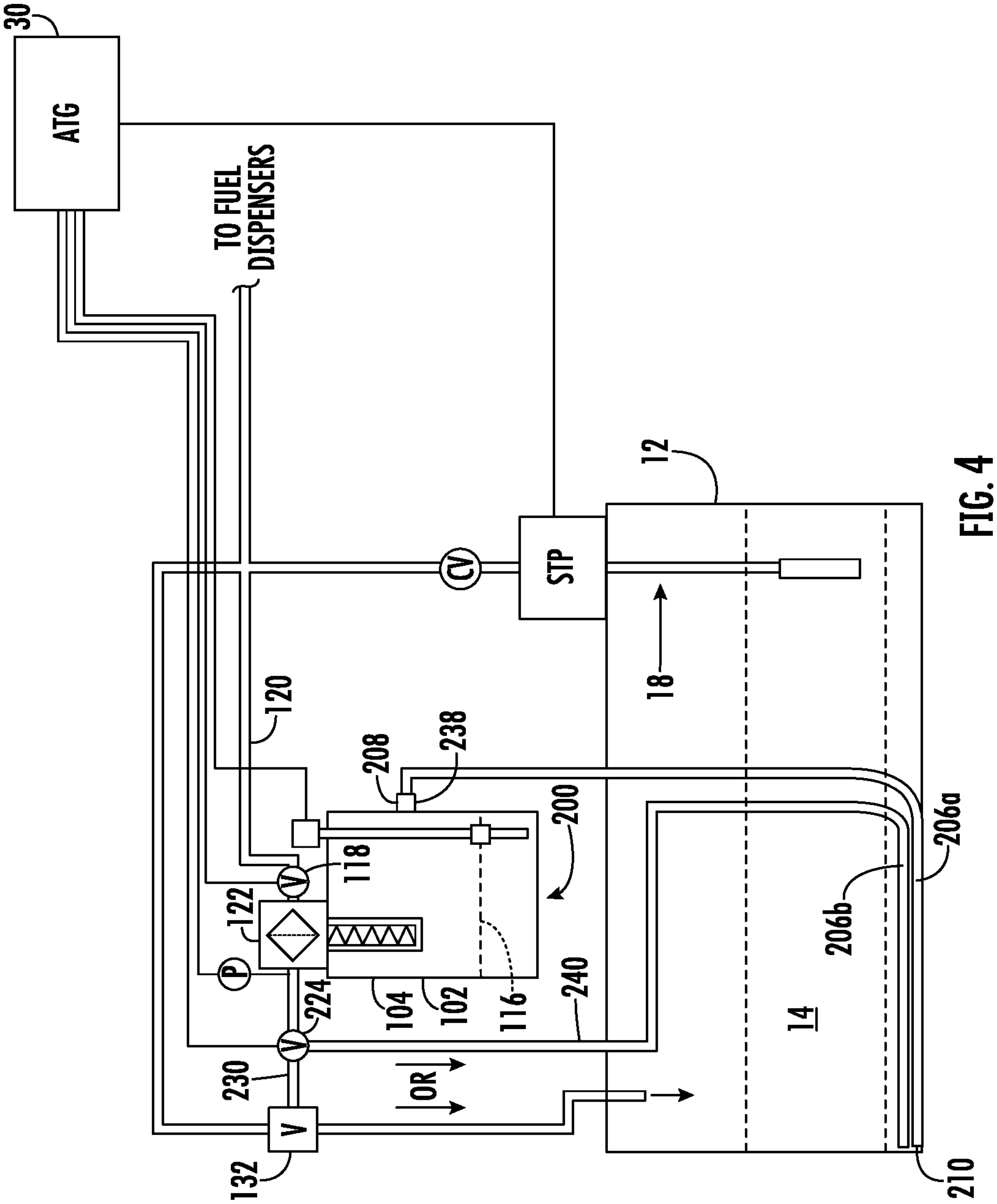
FIG. 4 is a diagrammatic representation of a fuel storage and supply arrangement having a fuel conditioning assembly in accordance with another embodiment of the present invention.

FIG. 4 illustrates an alternative embodiment of an ISFC assembly 200 in accordance with the present invention. Elements that are unchanged from the previous embodiment will be identified by the same reference number. Analogous elements will be identified by a reference number augmented by one hundred from the previous embodiment. In this case, separate suction and sweeper lines 206*a* and 206*b* are shown. The lines may be packaged into a single water intake device as described above, although the water intake device need not have a check mechanism in this arrangement. Instead, a check mechanism 238 may be located at port 208. Sweeper line 206*b* may comprise multiple tubes with outlets at different locations to guide water toward the lowest part of the tank 12 as described above (where the inlet 210 of suction line 206*a* is located). Sweeper lines 206*b* are shown slightly above the bottom of tank 12 in this illustration, but may actually rest on the tank bottom alongside suction line 206*a*.

Fuel is supplied to sweeper line 206*b* in this embodiment along a line 240 that is fluidly connected to outlet valve 224. Outlet valve 224 has a single inlet and two outlets, one of which is open and the other of which is closed, depending on the activation state of outlet valve 224. For example, if outlet valve 224 is de-energized, then pressurized fuel exiting coalescing housing 104 fed through sweeper line 206*a*. The pressurized fuel is supplied by pump assembly 18 along branch line 120 through inlet valve 118 (which is open). The fuel passes through filtration unit 122 for polishing and fine water removal, before being supplied back to tank 12.

Alternatively, outlet valve 224 may be energized which closes the outlet to line 240. Instead, the outlet to line 230 will be open. Fuel flow through siphon device 132 from pump assembly 18 creates a vacuum at coalescing housing 102 as described above. If inlet valve 118 is closed, water and/or fuel at the bottom of tank 12 will be drawn into coalescing housing 102 for gross water separation by gravity as described above.

Referring now to FIGS. 5-8, additional details of WID 106 will be explained. As noted briefly above, it has been found that aggressively agitating water at the bottom of the fuel storage tank can lead to an undesirable level of emulsified water with the fuel. The design of WID 106 produces no more than very low levels of turbulence at the tank bottom while providing broad access for suctioning water. In the sweeper mode, pressure from pump assembly 18 creates a gentle sweeping motion that ejects fuel along the tank bottom. Water pools at a collection point, either at the next available downstream access tube or, ultimately, at the end suction point (e.g., at the lowest point in the tank).

Figure 6A:
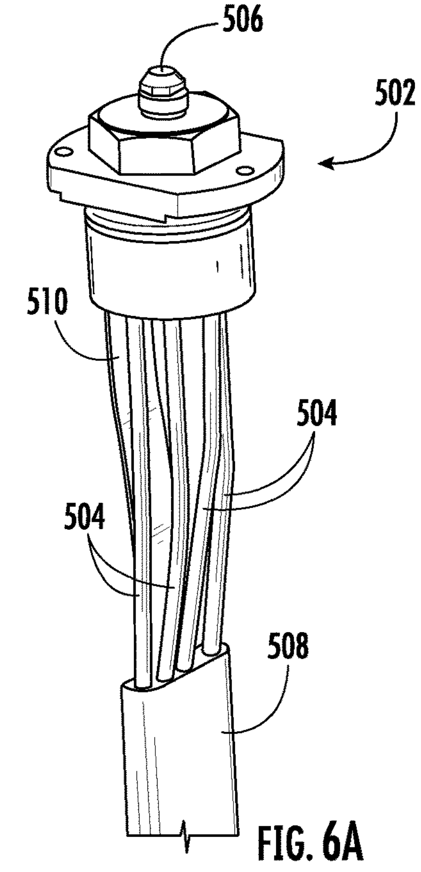
FIG. 6A is a fragmentary view of a coupling (manifold) portion of the water intake device of FIG. 5.
Figure 6B:
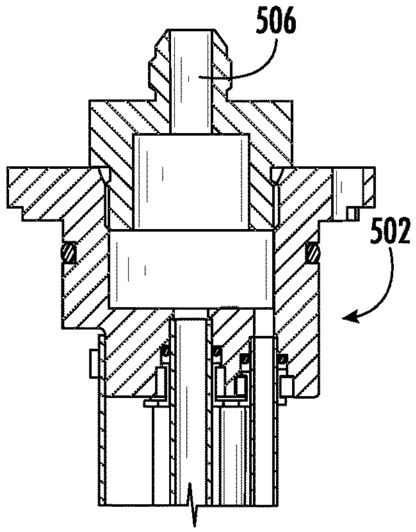
FIG. 6B is a cross section of part of the coupling portion of FIG. 6A.

In this embodiment, WID 106 includes a coupling element, or header manifold 502, located at its proximal end (i.e., the end where it connects to other piping of IFSC assembly 100) and an elongate flow structure 503. As shown in FIGS. 6A and 6B, manifold 502 is configured in this embodiment as a “6 to 1” manifold whereby six tubes of flow structure 503, such as tubes 504, converge to a single inlet/outlet 506. The tubes 504 are preferably constructed of any suitable flexible material, such as FEP. In a preferred embodiment, the tubes 504 may have a diameter of ¼" or ⅜". In addition, the tubes 504 may be encased in a suitable sheath 508, such as PVC heat shrink material. A substrate, or band 510, extends along the entire length of WID 106 to limit movement and to allow precise placement of the distal end of WID 106 at the lowest point in the tank. In a preferred embodiment, band 510 may be stainless steel. Band 510 provides a semi-rigid characteristic that allows the elongate structure 503 to be guided, as will be described more fully below. Dimensions and materials notwithstanding, the preferred embodiment is situated in such a way that the equidistant spacing of the tubes along the tank length as well as balancing of tube diameter and resultant flow area, produces an operating pressure differential of less than 2 pounds per square inch (psi) and a flow rate of less than 2 gallons per minute (gpm) in suction which creates the optimum efficiency for water removal.

Figure 5:
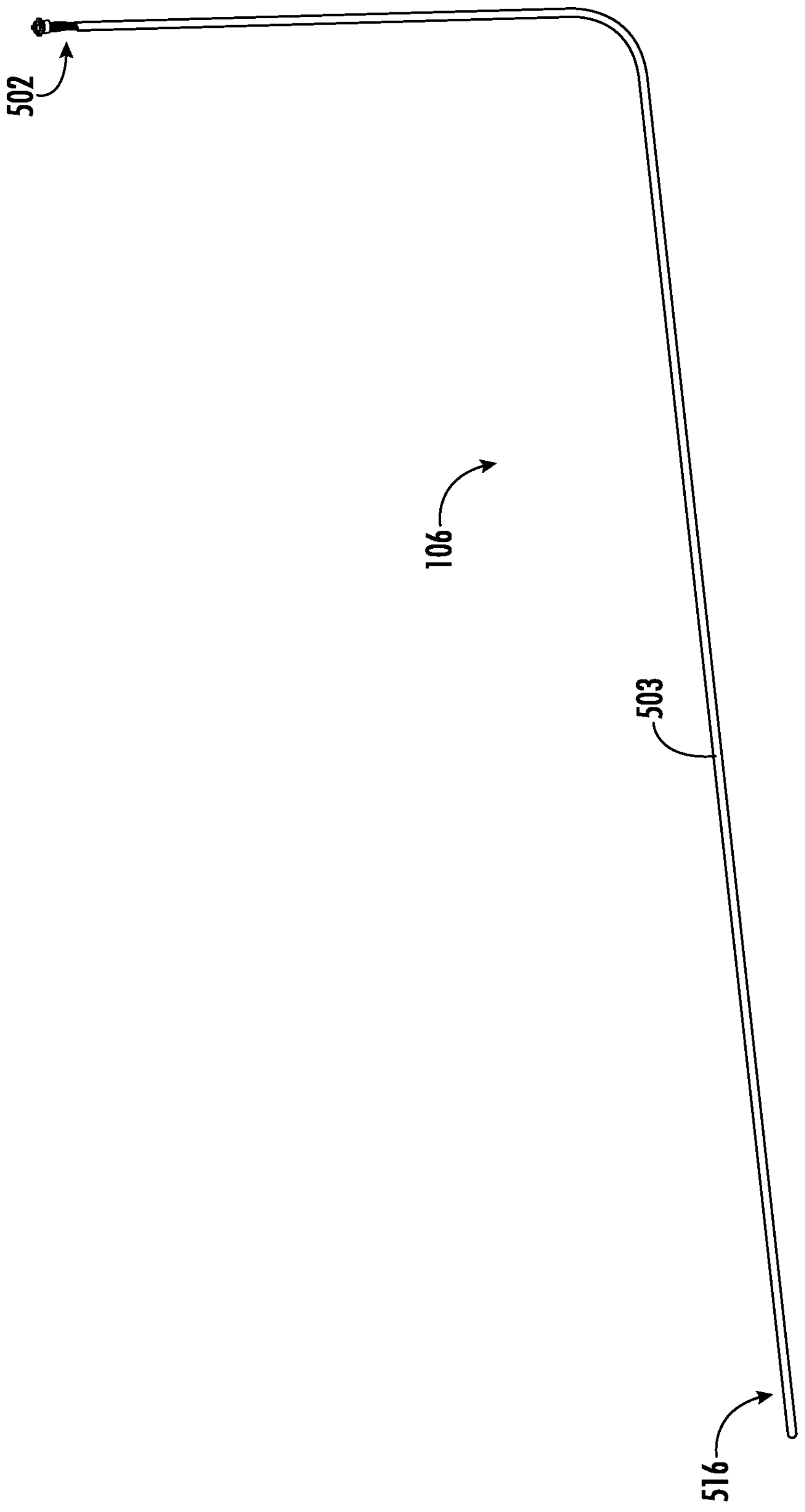
FIG. 5 is a perspective view of a water intake device that may be used with a fuel conditioning assembly of the present invention.
Figure 7A:
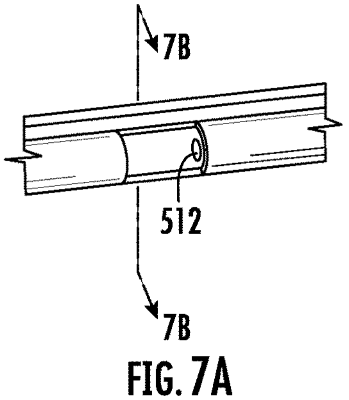
FIG. 7A is a fragmentary view of an intermediate portion of the water intake device of FIG. 5.
Figure 7B:
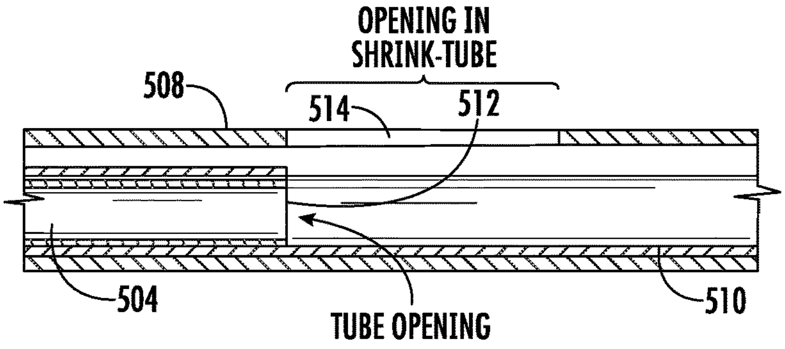
FIG. 7B is a cross section of the intermediate portion of FIG. 7A as taken along line 7B-7B.

As shown in FIG. 5, flow structure 503 typically assumes an L-shaped configuration when installed, having a generally vertical leg as well as a generally horizontal leg along the bottom of the tank. While embodiments are contemplated in which respective tubes 504 terminate at a single location along the horizontal leg, respective tubes 504 terminate in the illustrated embodiment at spaced apart locations along the horizontal leg to produce a plurality of inlets/outlets for water collection and fuel ejection during sweeping. One such location is shown in FIGS. 7A and 7B, where an inlet/outlet 512 is produced by the termination of a tube 504. In this regard, different tubes may have different diameters to prioritize flow through the longest tube that extends to the end of WID 106. For example, the longest tube may have a ⅜" inner diameter with shorter tubes have a ¼" inner diameter.

Figure 8:
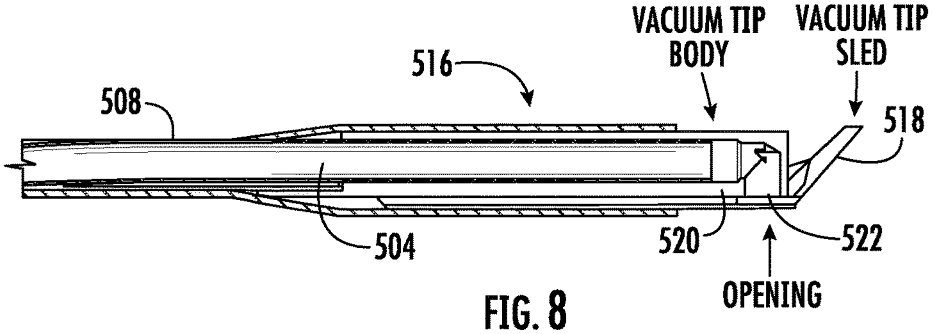
FIG. 8 is a fragmentary cross-sectional view of an end portion of the water intake device of FIG. 5.

Referring now to FIG. 8, the distal end of flow structure 503 has an enlarged tip portion 516 that surrounds the termination of the longest tube 504. In this example, tip portion 516 carries an angled “sled” 518 that facilitates movement of tip portion 516 along the tank bottom during installation. A right angle diverter 520 directs the end opening 522 toward the bottom of the tank, as shown. One skilled in the art will appreciate that embodiments not having such a sled structure are also contemplated.

In this embodiment, WID 106 is formed as a flexible element where all flow is chambered through a common tubing system. This design directs all flow through a common plenum and common tubing and connects to the in-sump fuel conditioner (filtration unit) through a single open port with no valving. Moreover, WID 106 accesses, water via suction, and directs any accumulated water with pressurized clean fuel in a completely distributed manner in both modes.

Figure 9:
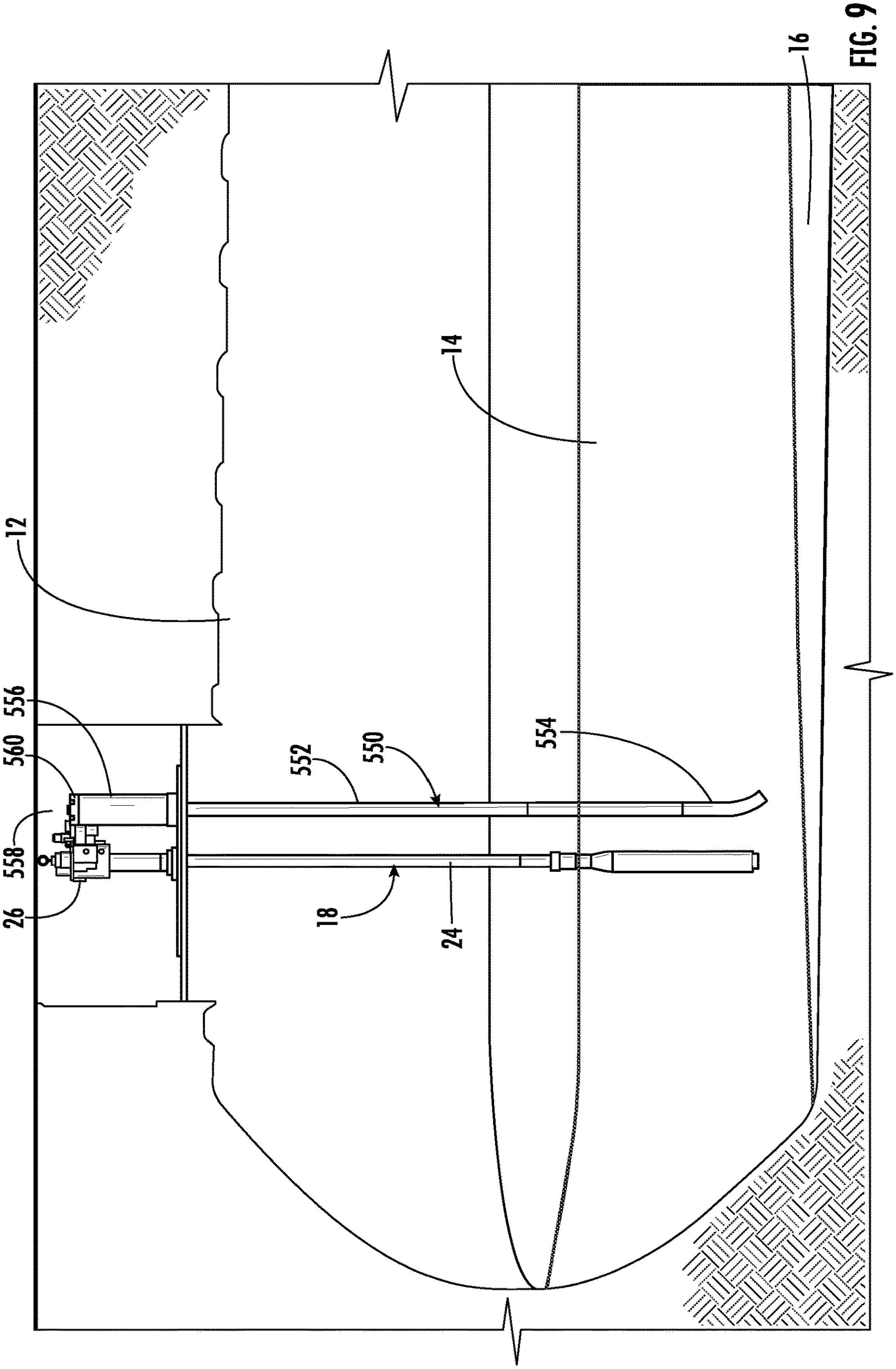
FIG. 9 illustrates a portion of a fuel storage tank showing a guide tube therein for insertion of a water intake device.

In addition, WID 106 is simply guided to the tank bottom and pushed along the length of the tank bottom via a guide tube. It is essentially self-deploying, with minimum effort and disruption to the tank structure. Toward this end, FIG. 9 illustrates a guide tube 550 situated in a fuel storage tank 12 to facilitate insertion of a WID 106. Guide tube 550 includes a substantially straight portion 552 extending vertically into the interior of the tank 12. An arcuate portion 554 is located at the distal end of guide tube 550. In this embodiment, guide tube 550 is mounted via a tubular riser 556 located in a sump 558. The proximal end of guide tube 550 carries a flange 560 that is attached to the riser 556, such as by bolts. Preferably, the flange 560 may carry indicia, such as an arrow, indicating the direction of arcuate portion 554 so that the installer can direct it toward the lowest portion of the tank (where water will tend to collect).

Figure 10:
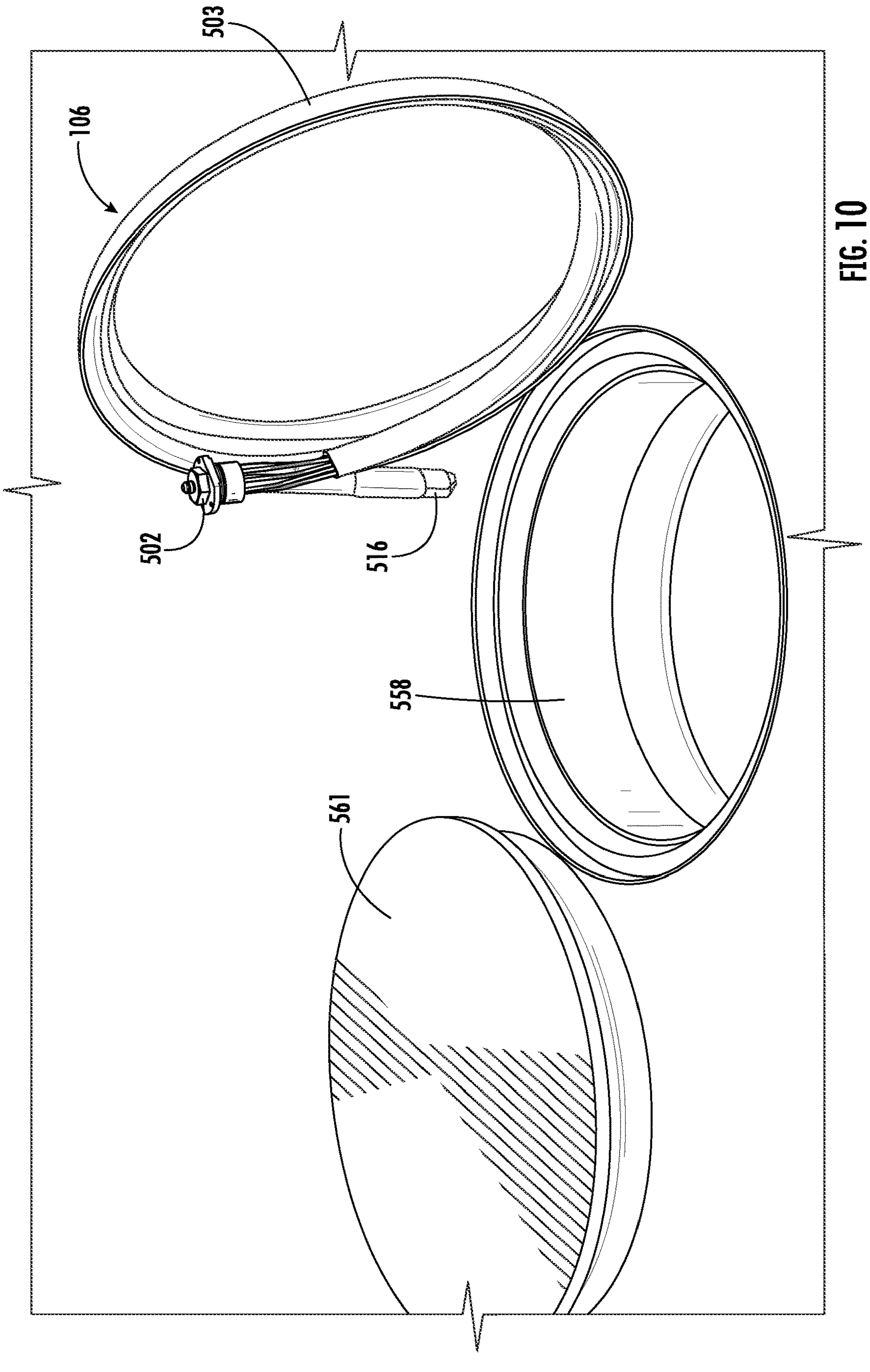
FIG. 10 illustrates a sump at a fueling site with the water intake device prior to installation.

FIG. 10 illustrates WID 106 prior to its installation in the fuel storage tank 12. As can be seen, the elongate flow structure 503 is initially coiled in this embodiment for efficient storage. Installation begins by inserting tip portion 516 into the proximal end of guide tube 550 in the sump 558.

Figure 11:
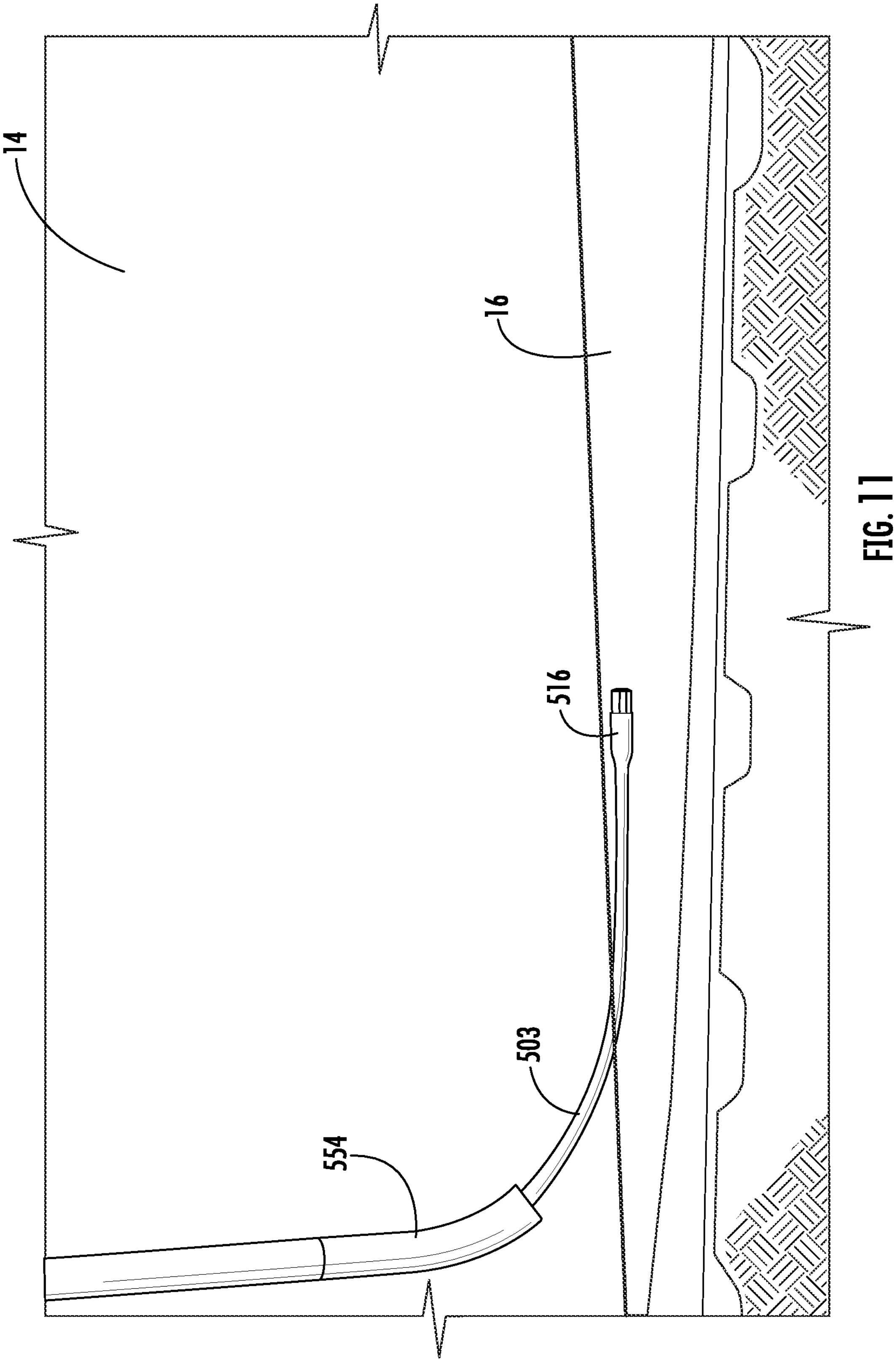
FIG. 11 shows the water intake device being partially inserted into the fuel storage tank.
Figure 12:
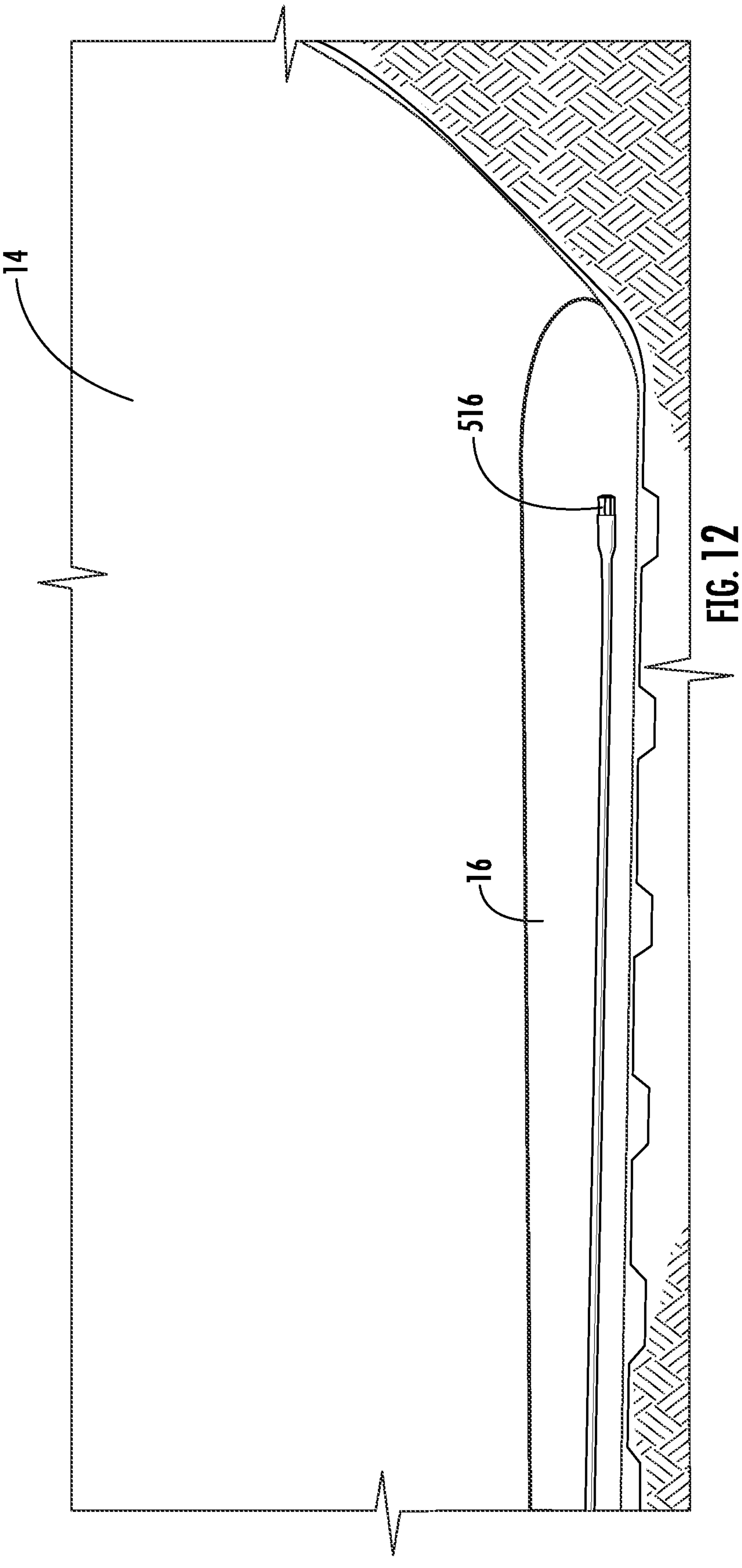
FIG. 12 shows the water intake device fully inserted into the fuel storage tank.

(The sump lid 561 is removed and shown on the forecourt surface next to the sump opening.) As flow structure 503 is uncoiled, additional length of the flow structure 503 is fed into the guide tube 550. As shown in FIG. 11, tip portion 516 of flow structure 503 eventually exits the arcuate portion 554 of guide tube 550. Because of the orientation of the arcuate portion 554, tip portion 516 will move along the tank bottom as the installations proceeds toward the desired location in the tank (typically at or near the lowest point). Once manifold 502 is located at flange 560 of the guide tube 550, tip portion 516 will be at the desired location.

Figure 13:
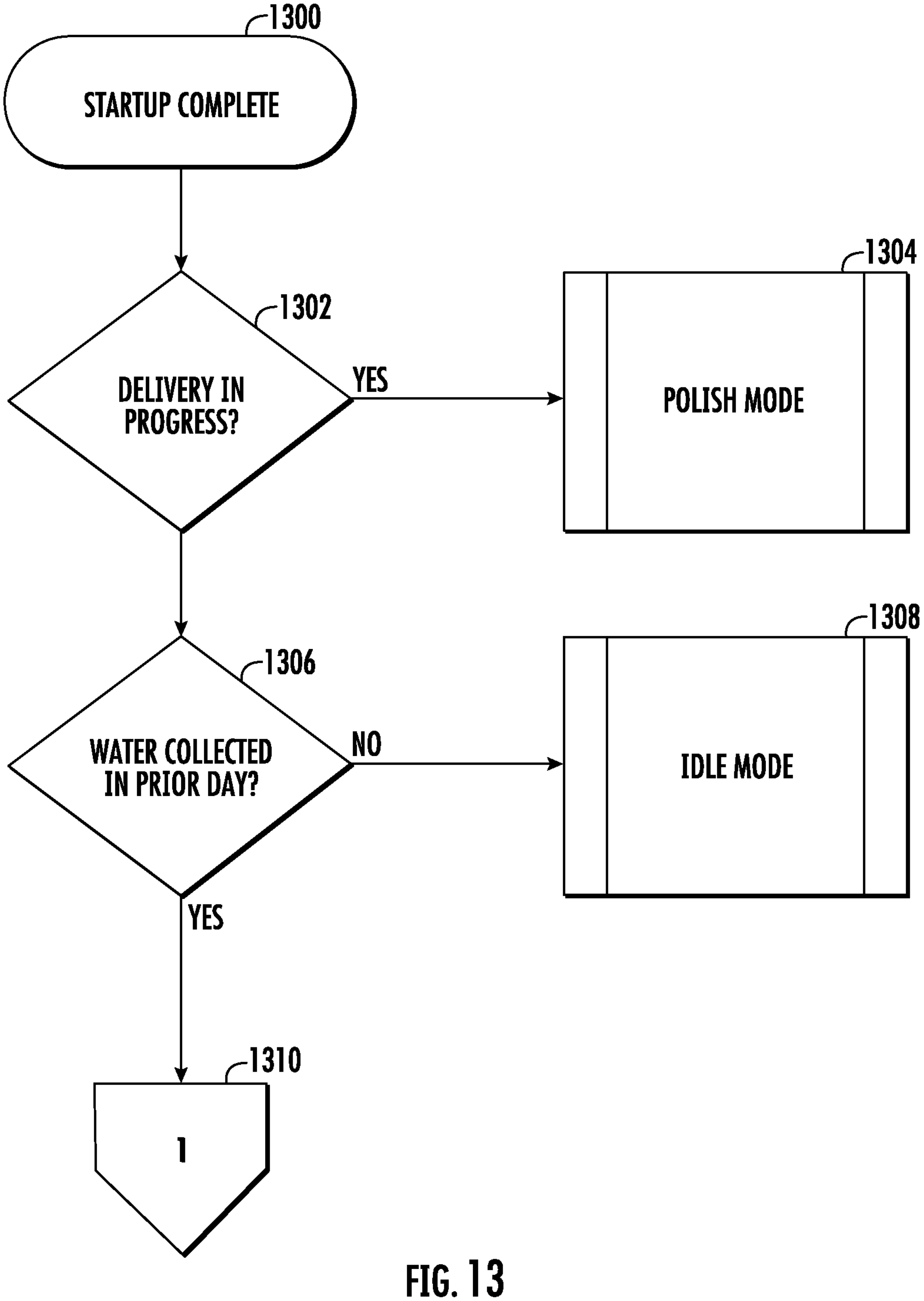
FIGS. 13-16 are process flowcharts of fuel conditioning methodology in accordance with aspects of the present invention.

FIGS. 13-16 illustrate various aspects of the operation of IFSC assemblies 100 and 200 (e.g., under the control of ATG 30) according to certain aspects. Referring now to FIG. 13, once system start-up is complete (as indicated at step 1300), a determination is made of whether a fuel delivery is in progress (as indicated at 1302). If so, the IFSC assembly enters a polish mode (as indicated at 1304) wherein pressurized fuel supplied by the pump assembly is filtered and fine water removal is accomplished. The polish mode may continue for a period of time (e.g., 30 minutes) after the fuel delivery is completed to ensure that the fuel is appropriately conditioned after agitation caused in the tank by the delivery. If no water has been collected in the prior day (as indicated at decision point 1306), the IFSC assembly enters an idle mode (as indicated at 1308). If water has been collected, the process continues (as indicated at 1310) to FIG. 14.

Figure 14:
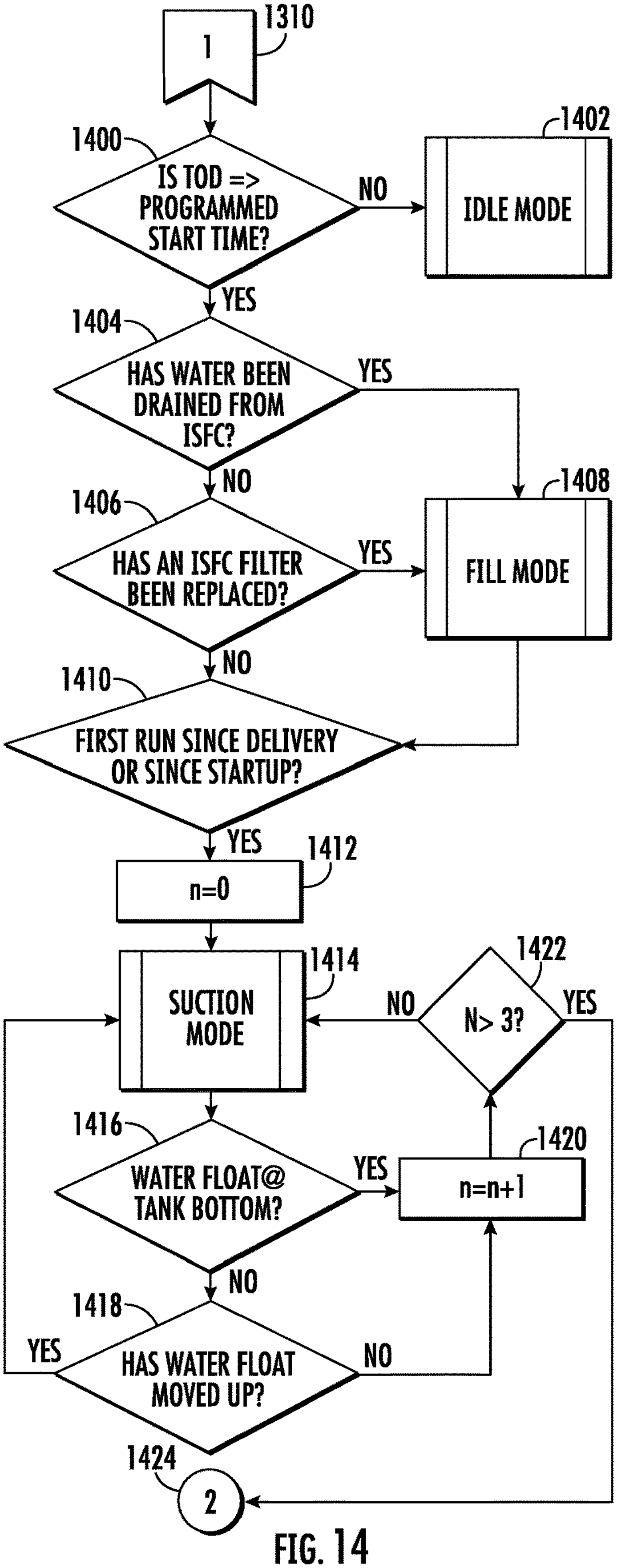
Figure 15:
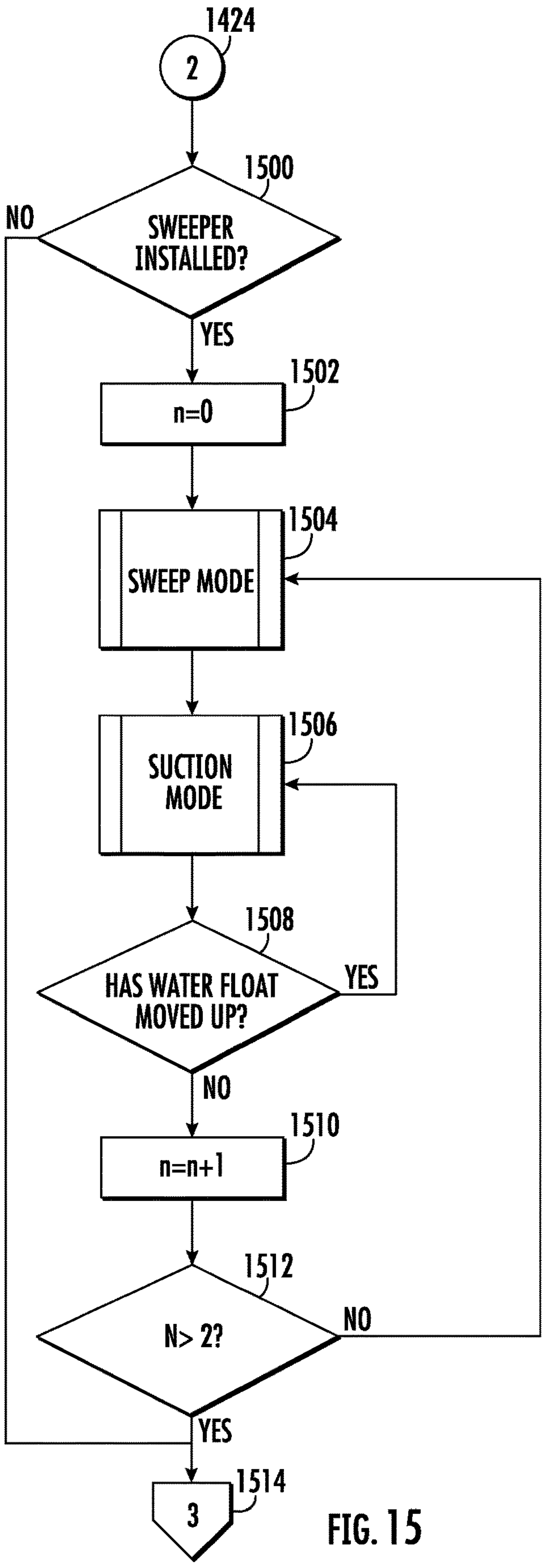

Referring now to FIG. 14, the IFSC assembly determines whether the time of day is greater than or equal to the programmed start time (as indicated at step 1400). For example, the programmed start time may be based on a time of day when the fuel dispensers are expected to be inactive, such as late at night. If the start time is not reached, the IFSC assembly remains in idle mode (as indicated at 1402). If the start time has been reached, a determination is made of whether water has been drained from the coalescing housing since the last start (as indicated at 1404). If not, a determination is made of whether any filter media in the water removal device 102 has been replaced (as indicated at step 1406). If water has been drained or the filter media has been replaced, the system enters a fill mode (as indicated at 1408) in which pressurized fuel is fed into the coalescing housing.

Next, the system begins to run in suction mode, with the counter starting at n=0 (as indicated at 1410, 1412, and 1414). A determination is then made as to whether the water float in the coalescing housing has moved up, indicating that water is being collected from the storage tank (as indicated at 1416 and 1418). If the water float remains at the bottom of the coalescing housing, the suction process continues as indicated at 1420 and 1422 until n is greater than a certain count (e.g., 3 or a user programmed limit). If the water float has risen by more than a threshold since the previous determination (e.g., 0.025 inches or as otherwise selected), suction is repeated. If the water float is no longer moving up (e.g., moving up less than the threshold), then the process increments until n is greater than 3 or a user programmed limit (as indicated at 1420 and 1422). If the water float is no longer moving up (e.g., moving up less than the threshold), then the process proceeds to FIG. 15 (as indicated at 1424)

Referring now to FIG. 15, a counter is again set to n=0 (as indicated at 1102). If a sweeper is installed (as indicated at 1500), the process then enters sweep mode (as indicated at 1504) for a period of time (e.g., two minutes or as set by the user). This tends to clear the tubes and also moves any water along the storage tank bottom as described above. The IFSC assembly then again enters suction mode (as indicated at 1506). A determination is made as to whether the water float is moving up, i.e., indicating that water is being collected (as indicated at 1508). If the water float is moving up, suction mode is continued (at least until the coalescing housing has reached its water limit).

If the water float is not moving up (e.g., moving up less than the threshold), a counter is incremented (as indicated at 1510 and 1512) until n is greater than a certain count (e.g., 2 or a user programmed limit). If n is not greater than the certain count (e.g., 2), sweep mode is begun again. If n is greater than the certain count (e.g., 2), the process proceeds to FIG. 16 (as indicated at 1514).

Figure 16:
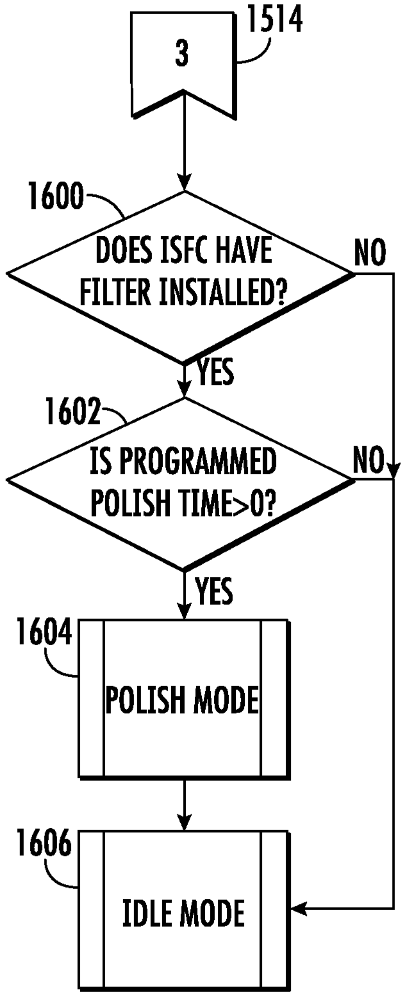
Figure 17:
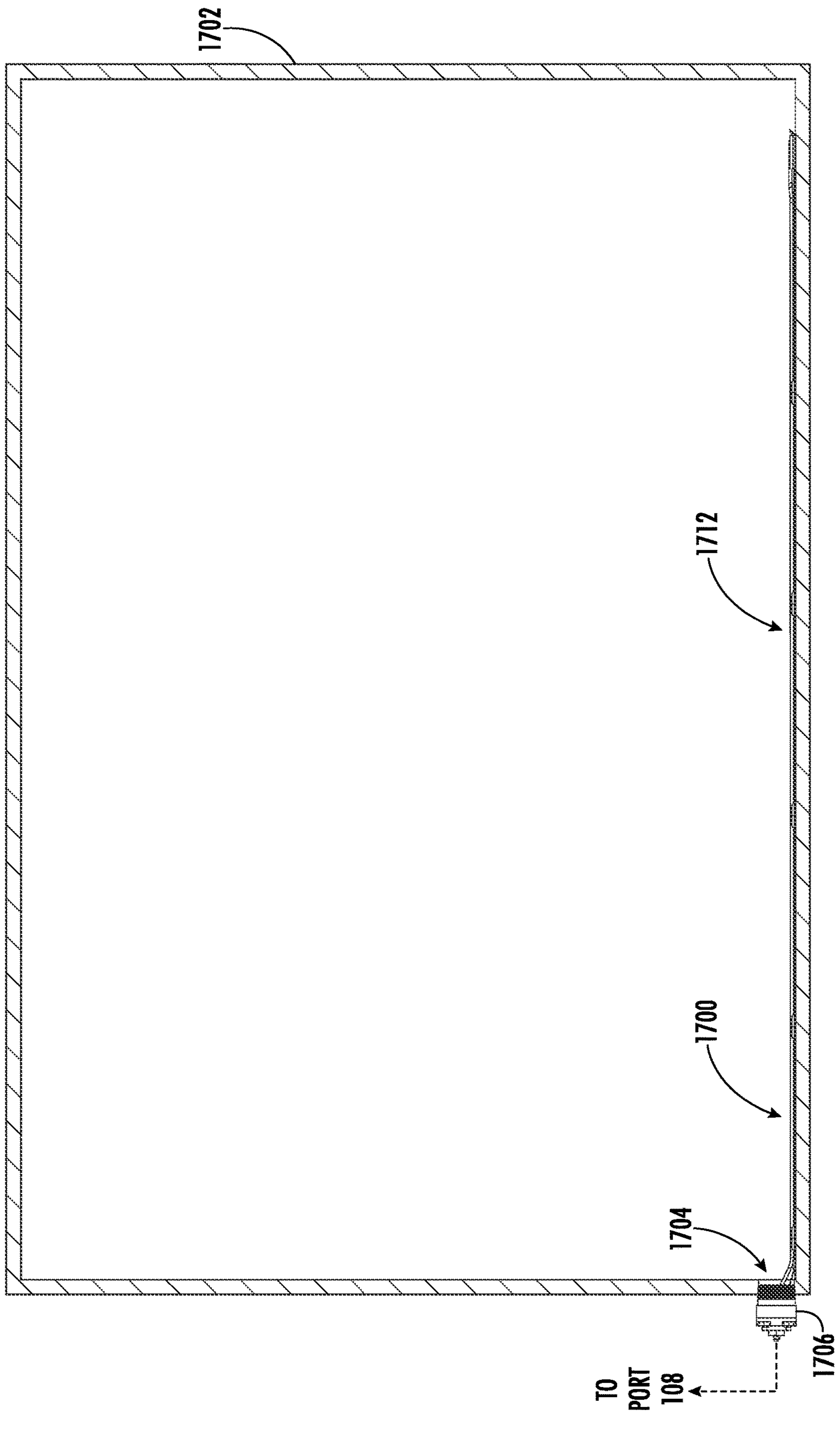
FIG. 17 is a cross-sectional view of an above-ground storage tank utilizing an alternative embodiment of a water intake device in accordance with the present invention.
Figure 18:
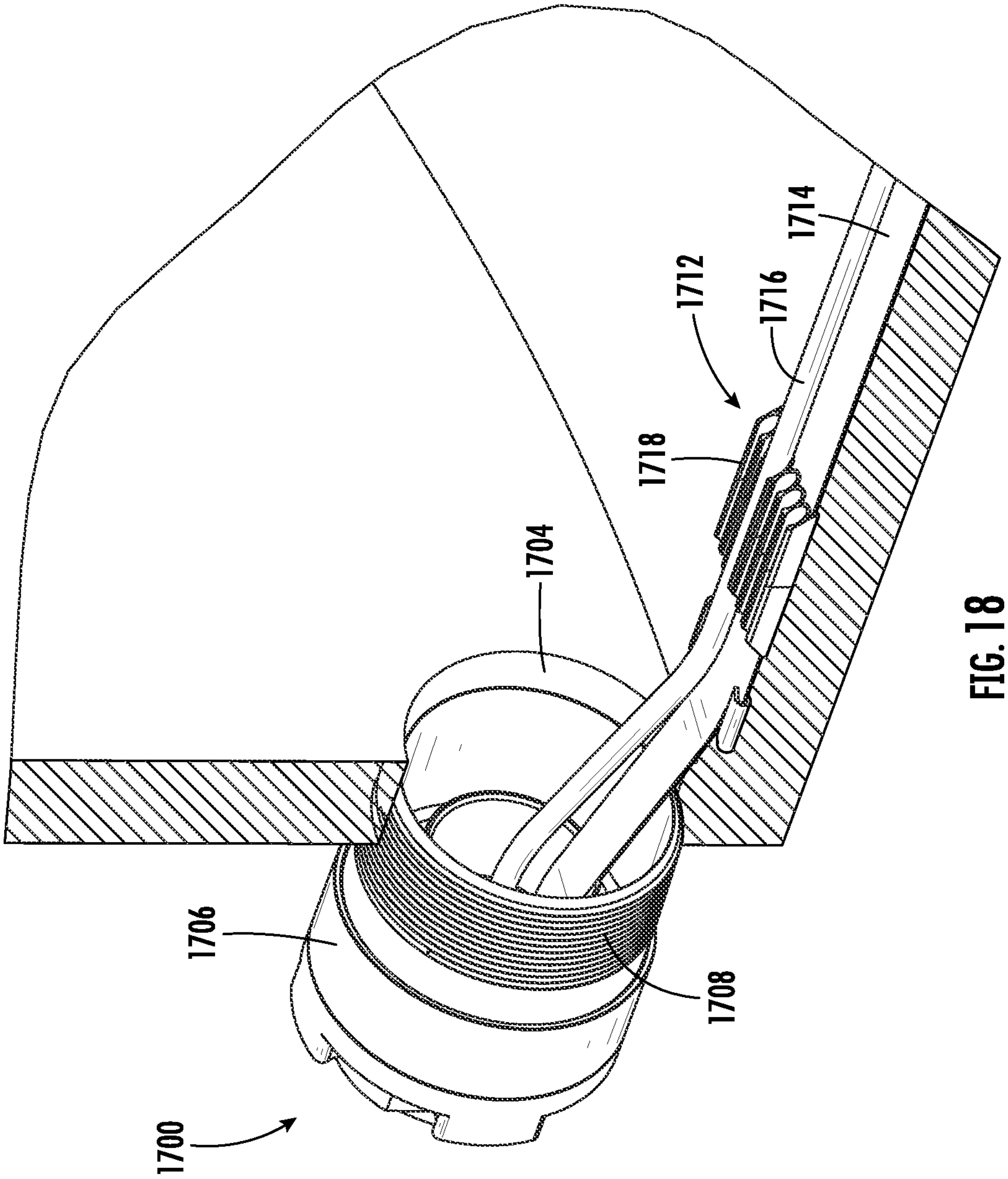
FIG. 18 is an isometric, enlarged, partial cross section of a portion of the above ground storage tank and water intake device of FIG. 17.
Figure 19:
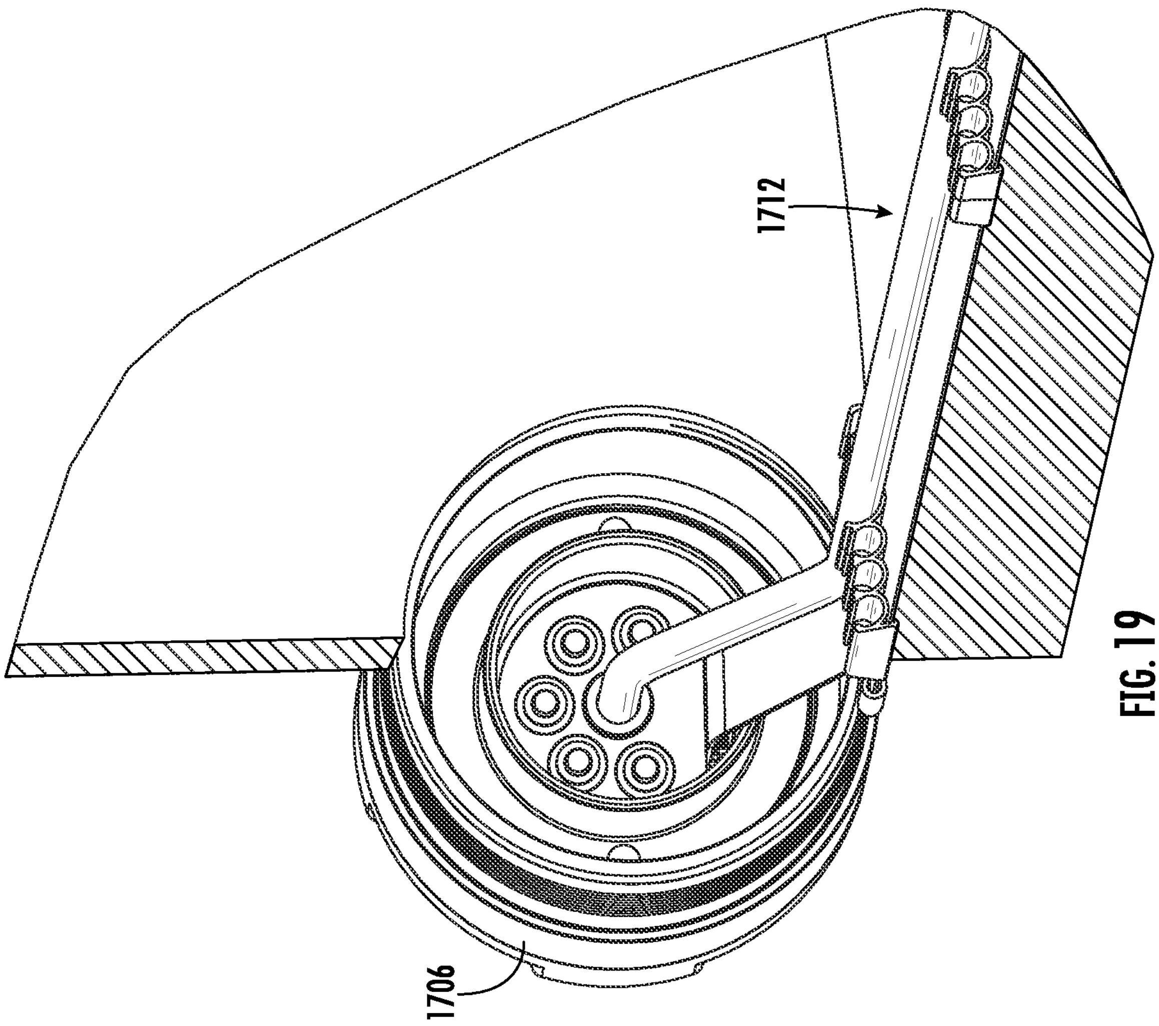
FIG. 19 is an isometric, enlarged, partial cross section of a portion of the above ground storage tank and water intake device of FIG. 17.
Figure 20:
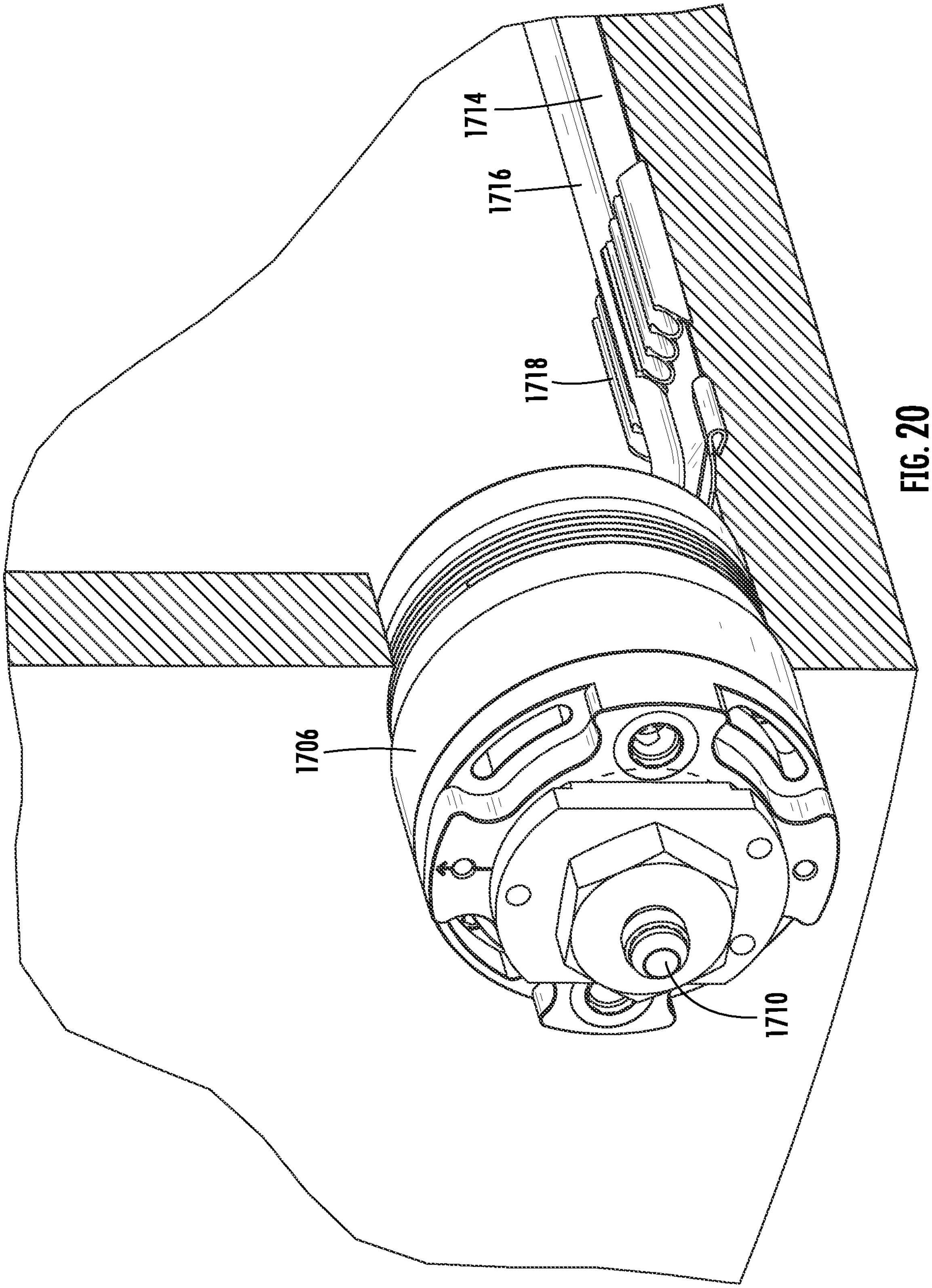
FIG. 20 is an isometric, enlarged, partial cross section of a portion of the above ground storage tank and water intake device of FIG. 17.

Referring now to FIG. 16, the IFSC assembly may then determine whether a filter has been installed (as indicated at 1600). If so, and the programmed polish time is greater than zero (as indicated at 1602), the IFSC assembly enters a polish mode (as indicated at 1604). The IFSC then returns to idle mode (as indicated at 1606).

FIGS. 17-20 illustrate various aspects of an alternative embodiment of a water intake device (WID) 1700 in accordance with the present invention. WID 1700 may be similar in many respects to WID 106, but is in this case installed in an above-ground fuel storage tank 1702. Because the sides of tank 1702 are exposed (i.e., not buried), WID 1700 may be substantially straight (i.e., not L-shaped) and installed through an aperture 1704 near the bottom of the tank. For example, the header manifold 1706 of WID 1700 may define exterior threads 1708 that engage interior threads of aperture 1704 to maintain WID 1700 in position. As one skilled in the art will recognize, header manifold 1706 may be otherwise similar to header manifold 502 discussed above. In this regard, header manifold 1706 may comprise an inlet/outlet 1710 (FIG. 20) that allows fluid communication with port 108. In this embodiment, piping between inlet/outlet 1710 and port 108 will reside outside of the tank 1702.

WID 1700 further includes an elongate flow structure 1712 that extends along the bottom of tank 1702. As one skilled in the art will appreciate, flow structure 1712 may be similar in many respects to flow structure 503 discussed above. For example, flow structure 1712 may have a substrate or band 1714 (e.g., a semi-rigid band) along which one or more tubes extend. Although only one such tube 1716 is shown in the partial views of FIGS. 18-20, multiple parallel tubes may typically be provided. Toward this end, the parallel tubes may be seated and maintained in multiple spacer structures 1718 provided along the length of band 1714. In addition, similar to the description above, the tubes may be encased in a sheath.

While various embodiments are contemplated, WID 1700 in this embodiment directs all flow through a common plenum and common tubing and connects to the in-sump fuel conditioner through a single open port with no valving.

Reference is made to U.S. Pub. App. No. 2020/0102207A1, incorporated by reference herein in its entirety for all purposes.

It will be appreciated that embodiments of the present invention provide compact and effective fuel conditioning and filtration capability. In this regard, water removal from USTs is necessary to prevent contamination and corrosion in the UST and other components of the fuel delivery system. The apparatus and method described herein provide direct benefits in water removal due to broader contact with the tank bottom where water collects as well as adapting to site conditions when water is not present or is inaccessible. Real time and historical information regarding water collection allows for predictive maintenance as well as water removal from the coalescing housing itself. Moreover, by self-adapting to water removal, when water is not present or is inaccessible, the pump is not run which yields a significant energy savings when compared to systems that would run at a programmed time for a programmed duration. In addition, by contacting the tank bottom over a wide area along the tank's length, more water is accessible to the system than would otherwise be the case.

Many modifications and other embodiments of the invention set forth herein will come to mind to one skilled in the art to which this invention pertains having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a general sense only and not for purposes of limitation.

What is claimed is:

1. A method used in conjunction with a fuel storage tank, said method comprising steps of:

(a) providing a water intake device having an elongate flow structure including at least one flexible flow tube and an elongate substrate adjacent to said flow tube, wherein said substrate provides a semi-rigid characteristic that allows the elongate flow structure to be guided;

(b) providing a guide tube having a substantially straight first portion and a distal second portion, the second portion defining an outlet directed away from an axis of the first portion;

(c) installing the guide tube generally vertically into a fuel storage tank with the second portion directed toward a desired guidance direction;

(d) moving the elongate flow structure of the water intake device through said guide tube into a deployed position.

2. A method as set forth in claim 1, wherein the distal second portion of the guide tube has an arcuate shape.

3. A method as set forth in claim 1, wherein the water intake device is initially coiled.

4. A method as set forth in claim 3, wherein the water intake device is uncoiled as it is inserted into the guide tube.

5. A method as set forth in claim 1, wherein step (d) involves pushing a tip portion of the guide tube along a bottom of the fuel storage tank.

* * * * *